(12) United States Patent
Kipnis et al.

(10) Patent No.: US 7,100,051 B1
(45) Date of Patent: Aug. 29, 2006

(54) PUBLIC-KEY SIGNATURE METHODS AND SYSTEMS

(75) Inventors: Aviad Kipnis, Jerusalem (IL); Jacques Patarin, Viroflay (FR); Louis Goubin, Paris (FR)

(73) Assignees: NDS Limited, West Drayton (GB); CP8 Technologies, Louveciennes (FR)

( * ) Notice: Subject to any disclaimer, the term of this patent is extended or adjusted under 35 U.S.C. 154(b) by 0 days.

(21) Appl. No.: 09/552,115

(22) Filed: Apr. 19, 2000

(30) Foreign Application Priority Data

Apr. 29, 1999 (EP) .................. 99401048

(51) Int. Cl.
*H04L 9/00* (2006.01)
(52) U.S. Cl. .............. 713/180; 713/168; 713/170; 713/180; 380/28; 380/30; 380/45
(58) Field of Classification Search ............... 713/168, 713/170, 18, 180; 380/30, 28, 45
See application file for complete search history.

(56) References Cited

U.S. PATENT DOCUMENTS

| | | | |
|---|---|---|---|
| 5,263,085 A | 11/1993 | Shamir | 380/30 |
| 5,351,298 A * | 9/1994 | Smith | 380/30 |
| 5,375,170 A | 12/1994 | Shamir | 380/30 |
| 5,790,675 A * | 8/1998 | Patarin | 713/180 |
| 6,076,163 A * | 6/2000 | Hoffstein et al. | 713/168 |
| 6,111,952 A * | 8/2000 | Patarin | 380/45 |

OTHER PUBLICATIONS

Jacques Patarin, 'Asymmetric Cryptography with a Hidden Monomial', Springer-Verlag Heidelberg, Lecture Notes in Computer Science vol. 1109, pp. 45-60.*
Patarin, J., "Hidden Field Equations (HFE) and Isomorphisms of Polynomials (IP): Two New Families of Asymmetric Algorithms," Eurocrypt '96 Proceedings, May 1996, pp. 33-48.
Kipnis, A. and A. Shamir, "Cryptanalysis of the Oil and Vinegar Signature Scheme," Crypto '98, Aug. 1998, pp. 257-266.

(Continued)

*Primary Examiner*—Ayaz Sheikh
*Assistant Examiner*—Shin-Hon Chen
(74) *Attorney, Agent, or Firm*—Ladas and Parry LLP

(57) ABSTRACT

The invention provides for a cryptographic method for digital signature.

A set S1 of k polynomial functions $P_k(x_1, \ldots, x_{n+v}, y_1, \ldots, y_k)$ are supplied as a public key, where k, v, and n are integers, $x_1, \ldots, x_{n+v}$ are n+v variables of a first type, and $y_1, \ldots, y_k$ are k variables of a second type, the set S1 being obtained by applying a secret key operation on a given set S2 of k polynomial functions $P'_k(a_1, \ldots, a_{n+v}, y_1, \ldots, y_k)$, $a_1, \ldots, a_{n+v}$ designating n+v variables including a set of n "oil" and v "vinegar" variables.

A message to be signed is provided and submitted to a hash function to produce a series of k values $b_1, \ldots, b_k$. These k values are substituted for the k variables $y_1, \ldots, y_k$ of the set S2 to produce a set S3 of k polynomial functions $P''_k(a_1, \ldots, a_{n+v})$, and v values $a'_{n+1}, \ldots, a'_{n+1}$, are selected for the v "vinegar" variables. A set of equations $P''_k(a_1, \ldots, a'_{n+v})=0$ is solved to obtain a solution for $a'_1, \ldots, a'_n$ and the secret key operation is applied to transform the solution to the digital signature.

36 Claims, 3 Drawing Sheets

OTHER PUBLICATIONS

Kipnis, A. et al., "Unbalanced Oil and Vinegar Signature Schemes," Eurocrypt '99, Aug. 1999, pp. 206-222.

T. Matsumoto et al., "Public Quadratic Polynomial-Tuples for Efficient Signature-Verification and Message-Encryption," Advances in Crytology—Eurocrypt '88, vol. 330 of Lecture Notes in Computer Science, May 1988, pp. 415-418.

"The Oil and Vinegar Scheme," Presented at the Dagstuml Workshop on Cryptography, Sep. 1997.

* cited by examiner

PUBLIC-KEY SIGNATURE METHODS AND SYSTEMS

FIELD OF THE INVENTION

The present invention generally relates to cryptography, and more particularly to public-key cryptography.

BACKGROUND OF THE INVENTION

The first public-key cryptography scheme was introduced in 1975. Since then, many public-keys schemes have been developed and published. Many public-key schemes require some arithmetic computations modulo an integer n, where today n is typically between 512 and 1024 bits.

Due to the relatively large number of bits n, such public-key schemes are relatively slow in operation and are considered heavy consumers of random-access-memory (RAM) and other computing resources. These problems are particularly acute in applications in which the computing resources are limited, such as smart card applications. Thus, in order to overcome these problems, other families of public-key schemes which do not require many arithmetic computations modulo n have been developed. Among these other families are schemes where the public-key is given as a set of k multivariable polynomial equations over a finite mathematical field K which is relatively small, e.g. between 2 and $2^{64}$.

The set of k multivariable polynomial equations can be written as follows:

$$y_1 = P_1(x_1, \ldots, x_n)$$

$$y_2 = P_2(x_1, \ldots, x_n)$$

$$y_k = P_k(x_1, \ldots, x_n),$$

where $P_1, \ldots, P_K$ are multivariable polynomials of small total degree, typically, less than or equal to 8, and in many cases, exactly two.

Examples of such schemes include the C* scheme of T. Matsumoto and H. Imai, the HFE scheme of Jacques Patarin, and the basic form of the "Oil and Vinegar" scheme of Jacques Patarin.

The C* scheme is described in an article titled "Public Quadratic Polynomial-tuples for Efficient Signature Verification and Message-encryption" in Proceedings of EURO-CRYPT'88, Springer-Verlag, pp. 419–453. The HFE scheme is described in an article titled "Hidden Fields Equations (HFE) and Isomorphisms of Polynomials (IP): Two New Families of Asymmetric Algorithms" in Proceedings of EUROCRYPT'96, Springer-Verlag, pp. 33–48. The basic form of the "Oil and Vinegar" scheme of Jacques Patarin is described in an article titled "The Oil and Vinegar Signature Scheme" presented at the Dagstuhl Workshop on Cryptography in September 1997.

In the basic form of the "Oil and Vinegar" scheme computation of a signature x of y is performed as follows:

Step 1: $y = (y_1, \ldots, y_n)$ is transformed into $b = (b_1, \ldots, b_n)$ such that $b = t^{-1}(y)$, where t is the secret, bijective, and affine function from $K^n$ to $K^n$.

Step 2: We find n variables $a_1, \ldots, a_n$ of K, and n variables $a'_1, \ldots, a'_n$, of K, such that the n equations (S) are satisfied:

$$\forall i,\ 1 \le i \le n,\ b_i = \Sigma \gamma ijk a'_j a'_k + \Sigma \lambda_{ijk} a'_j a'_k \Sigma \xi_{ijk} a'_j a'_k + \Sigma \xi'_{ij} a'_j \delta_i. \quad (S)$$

This can be done as follows: we choose at random the n variables $a'_i$, and then we compute the $a_i$ variables from (S) by Gaussian reductions (because—since there are no $a_i a_j$ terms—the (S) equations are n equations of degree one in the $a_i$ variables when the $a'_i$ variables are fixed).

Step 3: Let A be the element of $K^{2n}$ defined by $A = (a_1, \ldots, a_n, a'_1, \ldots, a'_n)$. A is transformed into x such that $x = s^{-1}(A)$, where s is the secret, bijective and affine function from $K^{2n}$ to $K^{2n}$.

However, the C* scheme and the basic form of the "Oil and Vinegar" scheme have been shown to be insecure in that cryptanalysis of both the C* scheme and the basic form of the "Oil and Vinegar" scheme have been discovered and published by Aviad Kipnis and Adi Shamir in an article titled "Cryptanalysis of the Oil and Vinegar Signature Scheme" in Proceedings of CRYPTO'98, Springer-Verlag LNCS no 1462, pp. 257–266. Weaknesses in construction of the HFE scheme have been described in two unpublished articles titled "Cryptanalysis of the HFE Public Key Cryptosystem" and "Practical Cryptanalysis of the Hidden Fields Equations (HFE)", but at present, the HFE scheme is not considered compromised since for well chosen and still reasonable parameters, the number of computations required to break the HFE scheme is still too large.

Some aspects of related technologies are described in the following publications:

U.S. Pat. No. 5,263,085 to Shamir describes a new type of digital signature scheme whose security is based on the difficulty of solving systems of k polynomial equations in m unknowns modulo a composite n; and U.S. Pat. No. 5,375,170 to Shamir describes a novel digital signature scheme which is based on a new class of birational permutations which have small keys and require few arithmetic operations.

The disclosures of all references mentioned above and throughout the present specification are hereby incorporated herein by reference.

SUMMARY OF THE INVENTION

The present invention seeks to improve security of digital signature cryptographic schemes in which the public-key is given as a set of k multivariable polynomial equations, typically, over a finite mathematical field K. Particularly, the present invention seeks to improve security of the basic form of the "Oil and Vinegar" and the HFE schemes. An "Oil and Vinegar" scheme which is modified to improve security according to the present invention is referred to herein as an unbalanced "Oil and Vinegar" (UOV) scheme. An HFE scheme which is modified to improve security according to the present invention is referred to herein as an HFEV scheme.

In the present invention, a set S1 of k polynomial functions is supplied as a public-key. The set S1 preferably includes the functions $P_1(x_1, \ldots, x_{n+v}, y_1, \ldots, y_k), \ldots, P_k(x_1, \ldots, x_{n+v}, y_1, \ldots, y_k)$, where k, v, and n are integers, $x_1, \ldots, x_{n+v}$ are n+v variables of a first type, and $y_1, \ldots, y_k$ are k variables of a second type. The set S1 is preferably obtained by applying a secret key operation on a set S2 of k polynomial functions $P'_1(a_1, \ldots, a_{n+v}, y_1, \ldots, y_k), \ldots, P'_k(a_1, \ldots, a_{n+v}, y_1, \ldots, y_k)$ where $a_1, \ldots, a_{n+v}$ are n+v variables which include a set of n "oil" variables $a_1, \ldots, a_n$, and a set of v "vinegar" variables an $a_{n+1}, \ldots a_{n+v}$. It is appreciated that the secret key operation may include a secret affine transformation s on the n+v variables $a_1, \ldots, a_{n+v}$.

When a message to be signed is provided, a hash function may be applied on the message to produce a series of k values $b_1, \ldots, b_k$. The series of k values $b_1, \ldots, b_k$ is preferably substituted for the variables $y_1, \ldots, y_k$ of the set S2 respectively so as to produce a set S3 of k polynomial functions $P'''_1(a_1, \ldots, a_{n+v}), \ldots, P'''_k(a_1, \ldots, a_{n+v})$. Then, v values $a'_{n+1}, \ldots, a'_{n+v}$ may be selected for the v "vinegar" variables $a_{n+1}, \ldots, a_{n+v}$, either randomly or according to a predetermined selection algorithm.

Once the v values $a'_{n+1}, \ldots, a'_{n+v}$ are selected, a set of equations $P'''_1(a_1, \ldots, a_n, a'_{n+1}, \ldots, a'_{n+v})=0, \ldots, P'''_k(a_1, \ldots, a_n, a'_{n+1}, \ldots, a'_{n+v})=0$ is preferably solved to obtain a solution for $a'_1, \ldots, a'_n$. Then, the secret key operation may be applied to transform $a'_1, \ldots, a'_{n+v}$ to a digital signature $e_1, \ldots, e_{n+v}$.

The generated digital signature $e_1, \ldots, e_{n+v}$ may be verified by a verifier which may include, for example, a computer or a smart card. In order to verify the digital signature, the verifier preferably obtains the signature $e_1, \ldots, e_{n+v}$, the message, the hash function and the public key. Then, the verifier may apply the hash function on the message to produce the series of k values $b_1, \ldots, b_k$. Once the k values $b_1, \ldots, b_k$ are produced, the verifier preferably verifies the digital signature by verifying that the equations $P_1(e_1, \ldots, e_{n+v}, b_1, \ldots, b_k)=0, \ldots, P_k(e_1, \ldots e_{n+v}, b_1, \ldots, b_k)=0$ are satisfied.

There is thus provided in accordance with a preferred embodiment of the present invention a digital signature cryptographic method including the steps of supplying a set S1 of k polynomial functions as a public-key, the set S1 including the functions $P_1(x_1, \ldots, x_{n+v}, y_1, \ldots, y_k), \ldots, P_k(x_1, \ldots, x_{n+v}, y_1, \ldots, y_k)$, where k, v, and n are integers, $x_1, \ldots, x_{n+v}$ are n+v variables of a first type, $y_1, \ldots, y_k$ are k variables of a second type, and the set S1 is obtained by applying a secret key operation on a set S2 of k polynomial functions $P'_1(a_1, \ldots, a_{n+v}, y_1, \ldots, y_k), \ldots, P'_k(a_1, \ldots, a_{n+v}, y_1, \ldots, y_k)$ where $a_1, \ldots, a_{n+v}$ are n+v variables which include a set of n "oil" variables $a_1, \ldots, a_n$, and a set of v "vinegar" variables $a_{n+1}, \ldots, a_{n+v}$, providing a message to be signed, applying a hash function on the message to produce a series of k values $b_1, \ldots, b_k$, substituting the series of k values $b_1, \ldots, b_k$ for the variables $y_1, \ldots, y_k$ of the set S2 respectively to produce a set S3 of k polynomial functions $P'''_1(a_1, \ldots, a_{n+v}), \ldots, P'''_k(a_1, \ldots, a_{n+v})$, selecting v values $a'_{n+1}, \ldots, a'_{n+v}$ for the v "vinegar" variables $a_{n+1}, \ldots, a_{n+v}$, solving a set of equations $P'''_1(a_1, \ldots, a_n, a'_{n+1}, \ldots, a'_{n+v})=0, \ldots, P'''_k(a_1, \ldots, a_n, a'_{n+1}, \ldots, a'_{n+v})=0$ to obtain a solution for $a'_1, \ldots, a'_n$, and applying the secret key operation to transform $a'_1, \ldots, a'_{n+v}$ to a digital signature $e_1, \ldots, e_{n+v}$.

Preferably, the method also includes the step of verifying the digital signature. The verifying step preferably includes the steps of obtaining the signature $e_1, \ldots, e_{n+v}$, the message, the hash function and the public key, applying the hash function on the message to produce the series of k values $b_1, \ldots, b_k$, and verifying that the equations $P_1(e_1, \ldots, e_{n+v}, b_1, \ldots, b_k)=0, \ldots, P_k(e_1, \ldots, e_{n+v}, b_1, \ldots, b_k)=0$ are satisfied.

The secret key operation preferably includes a secret affine transformation s on the n+v variables $a_1, \ldots, a_{n+v}$.

Preferably, the set S2 includes the set f(a) of k polynomial functions of the HFEV scheme. In such a case, the set S2 preferably includes an expression including k functions that are derived from a univariate polynomial. The univariate polynomial preferably includes a univariate polynomial of degree less than or equal to 100,000.

Alternatively, the set S2 includes the set S of k polynomial functions of the UOV scheme.

The supplying step may preferably include the step of selecting the number v of "vinegar" variables to be greater than the number n of "oil" variables. Preferably, v is selected such that $q^v$ is greater than $2^{32}$, where q is the number of elements of a finite field K.

In accordance with a preferred embodiment of the present invention, the supplying step includes the step of obtaining the set S1 from a subset S2' of k polynomial functions of the set S2, the subset S2' being characterized by that all coefficients of components involving any of the $y_1, \ldots, y_k$ variables in the k polynomial functions $P'_1(a_1, \ldots, a_{n+v}, y_1, \ldots, y_k), \ldots, P'_k(a_1, \ldots, a_{n+v}, y_1, \ldots, y_k)$ are zero, and the number v of "vinegar" variables is greater than the number n of "oil" variables.

Preferably, the set S2 includes the set S of k polynomial functions of the UOV scheme, and the number v of "vinegar" variables is selected so as to satisfy one of the following conditions: (a) for each characteristic p other than 2 of a field K in an "Oil and Vinegar" scheme of degree 2, v satisfies the inequality $q^{(v-n)-1}*n^4>2^{40}$, (b) for p=2 in an "Oil and Vinegar" scheme of degree 3, v is greater than $n*(1+\sqrt{3})$ and lower than or equal to $n^3/6$, and (c) for each p other than 2 in an "Oil and Vinegar" scheme of degree 3, v is greater than n and lower than or equal to $n^4$. Preferably, the number v of "vinegar" variables is selected so as to satisfy the inequalities $v<n^2$ and $q^{(v-n)-1}*n^4>2^{40}$ for a characteristic p=2 of a field K in an "Oil and Vinegar" scheme of degree 2.

There is also provided in accordance with a preferred embodiment of the present invention an improvement of an "Oil and Vinegar" signature method, the improvement including the step of using more "vinegar" variables than "oil" variables. Preferably, the number v of "vinegar" variables is selected so as to satisfy one of the following conditions: (a) for each characteristic p other than 2 of a field K and for a degree 2 of the "Oil and Vinegar" signature method, v satisfies the inequality $q^{(v-n)-1}*n^4>2^{40}$, (b) for p=2 and for a degree 3 of the "Oil and Vinegar" signature method, v is greater than $n*(1+\sqrt{3})$ and lower than or equal to $n^3/6$, and (c) for each p other than 2 and for a degree 3 of the "Oil and Vinegar" signature method, v is greater than n and lower than or equal to $n^4$. Preferably, the number v of "vinegar" variables is selected so as to satisfy the inequalities $v<n^2$ and $q^{(v-n)-1}*n^4>2^{40}$ for a characteristic p=2 of a field K in an "Oil and Vinegar" scheme of degree 2.

BRIEF DESCRIPTION OF THE DRAWINGS

The present invention will be understood and appreciated more fully from the following detailed description, taken in conjunction with the drawings in which.

Appendix I is an article by Aviad Kipnis, Jacques Patarin and Louis Goubin submitted for publication by Springer-Verlag in Proceedings of EUROCRYPT'99, the article describing variations of the UOV and the HFEV schemes.

DETAILED DESCRIPTION OF A PREFERRED EMBODIMENT

Figure 1:
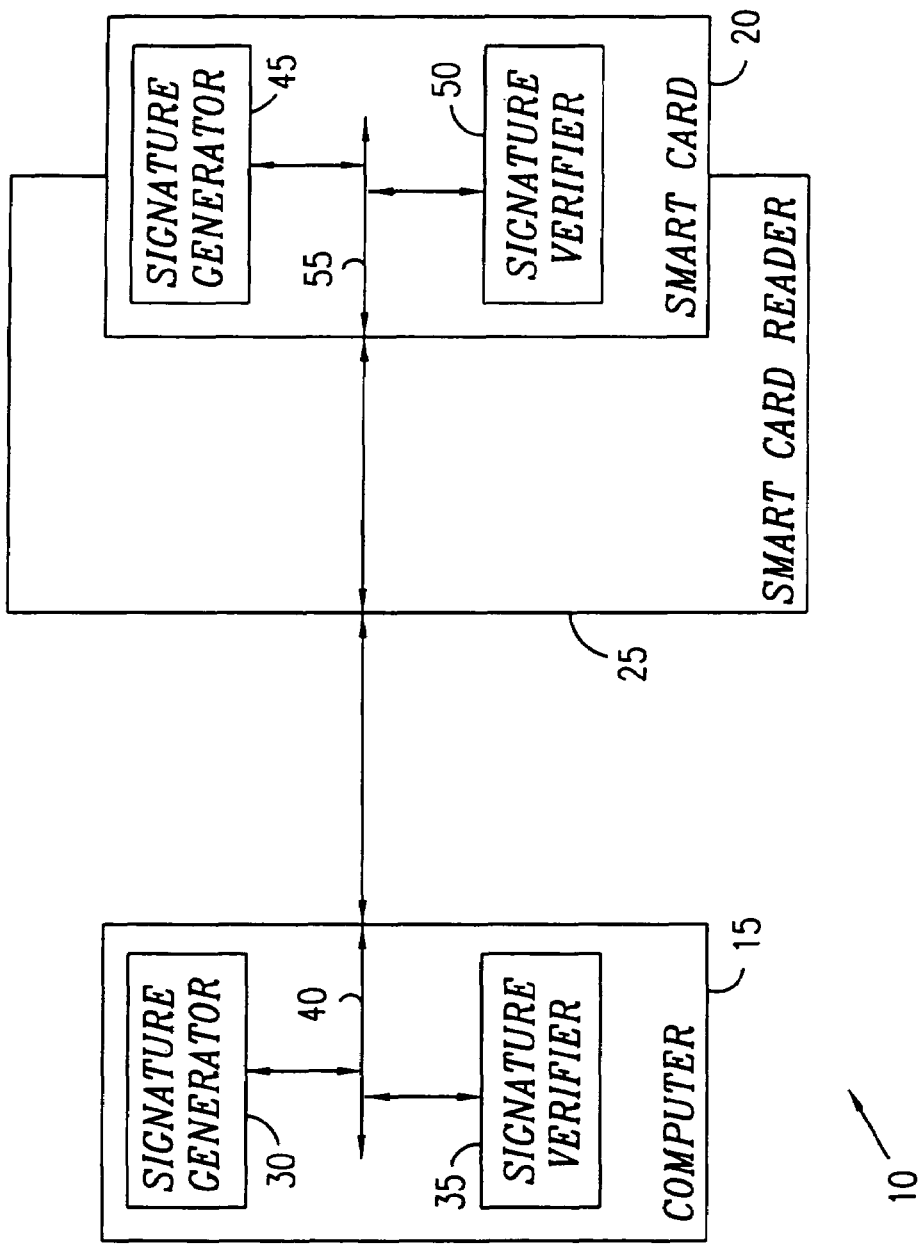
FIG. 1 is a simplified block diagram illustration of a preferred implementation of a system for generating and verifying a digital signature to a message, the system being constructed and operative in accordance with a preferred embodiment of the present invention.

Reference is now made to FIG. 1 which is a simplified block diagram illustration of a preferred implementation of a system 10 for generating and verifying a digital signature to a message, the system 10 being constructed and operative in accordance with a preferred embodiment of the present invention.

Preferably, the system 10 includes a computer 15, such as a general purpose computer, which communicates with a smart card 20 via a smart card reader 25. The computer 15 may preferably include a digital signature generator 30 and a digital signature verifier 35 which may communicate data via a communication bus 40. The smart card 20 may preferably include a digital signature generator 45 and a digital signature verifier 50 which may communicate data via a communication bus 55.

It is appreciated that in typical public-key signature scheme applications, a signer of a message and a receptor of a signed message agree on a public-key which is published, and on a hash function to be used. In a case that the hash function is compromised, the signer and the receptor may agree to change the hash function. It is appreciated that a generator of the public-key need not be the signer or the receptor.

Preferably, the digital signature verifier 35 may verify a signature generated by one of the digital signature generator 30 and the digital signature generator 45. Similarly, the digital signature verifier 50 may verify a signature generated by one of the digital signature generator 30 and the digital signature generator 45.

Figure 2A:
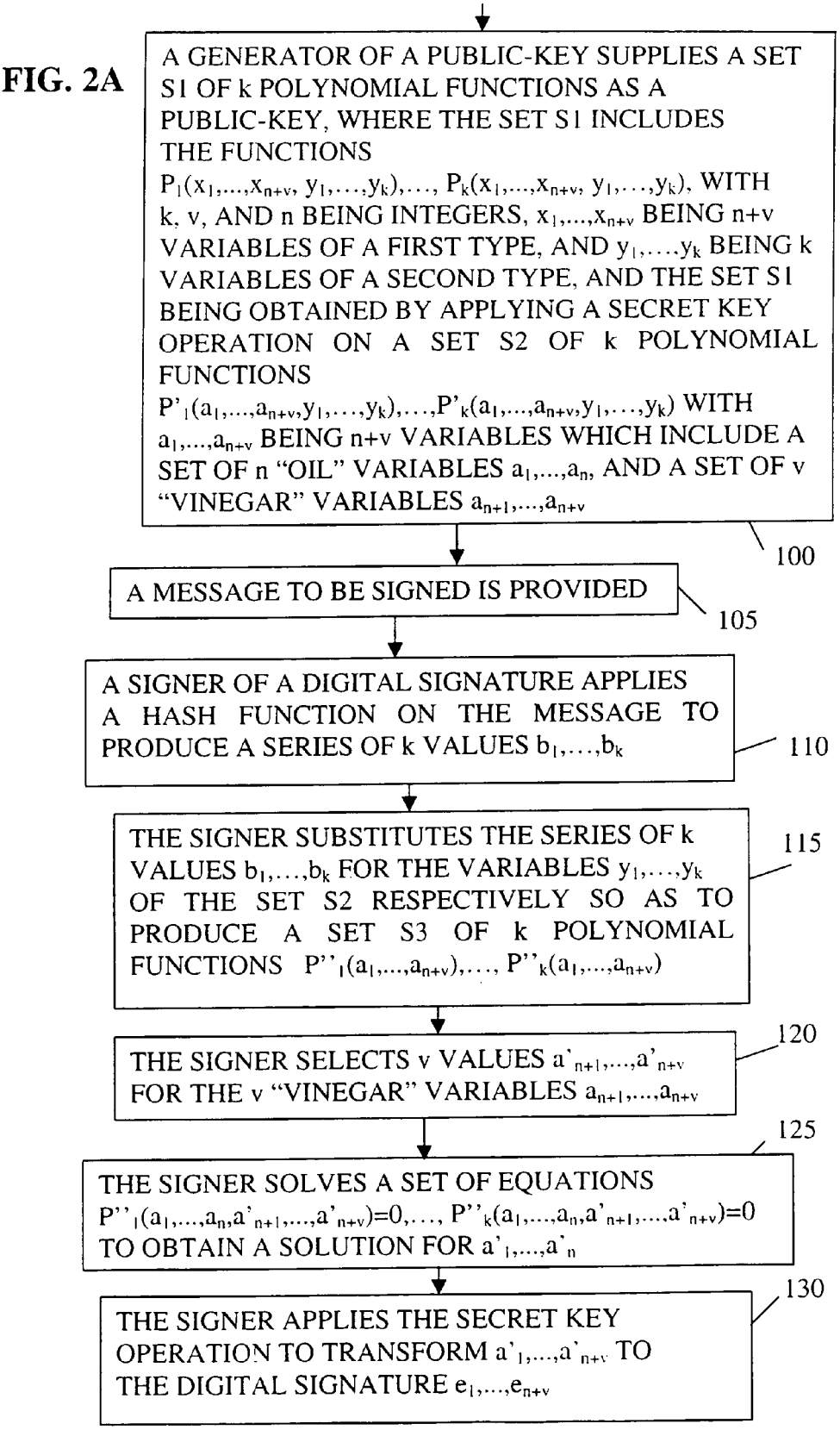
FIG. 2A is a simplified flow chart illustration of a preferred digital signature cryptographic method for generating a digital signature to a message, the method being operative in accordance with a preferred embodiment of the present invention.
Figure 2B:
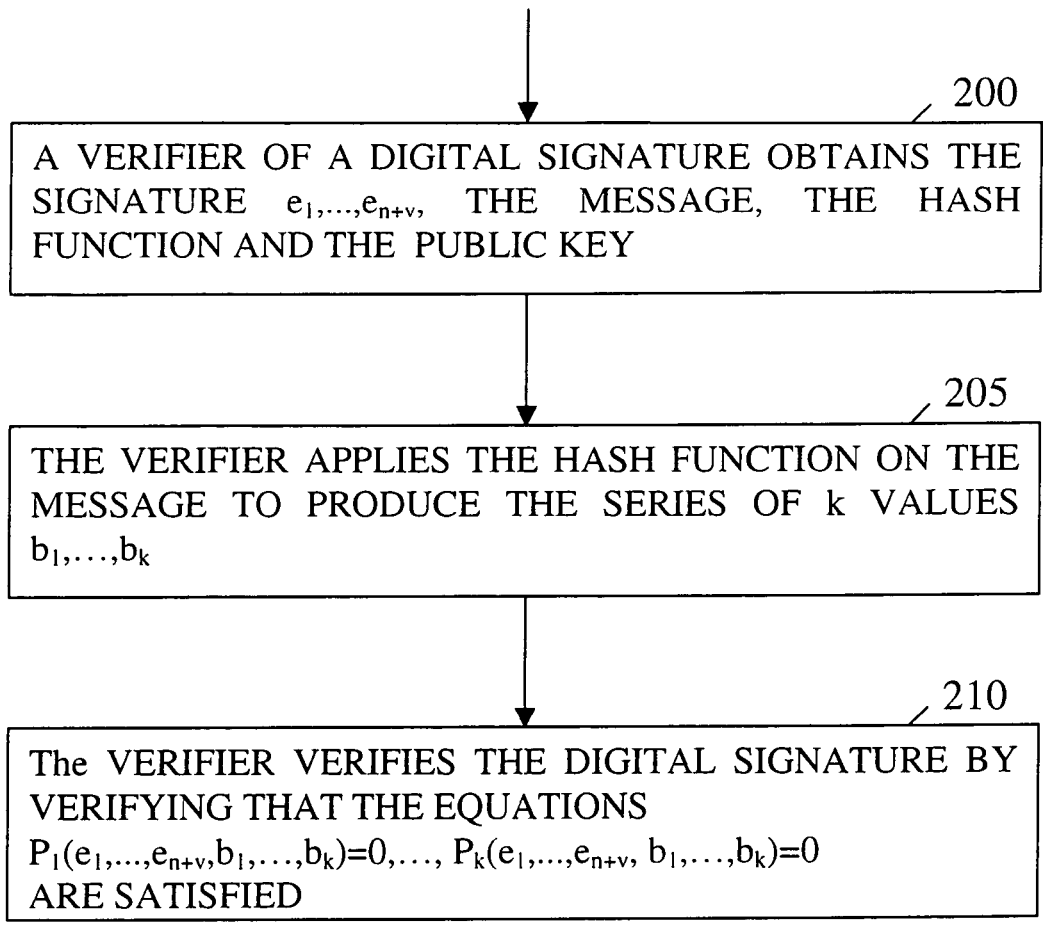
FIG. 2B is a simplified flow chart illustration of a preferred digital signature cryptographic method for verifying the digital signature of FIG. 2A, the method being operative in accordance with a preferred embodiment of the present invention.

Reference is now made to FIG. 2A which is a simplified flow chart illustration of a preferred digital signature cryptographic method for generating a digital signature to a message in a first processor (not shown), and to FIG. 2B which is a simplified flow chart illustration of a preferred digital signature cryptographic method for verifying the digital signature of FIG. 2A in a second processor (not shown), the methods of FIGS. 2A and 2B being operative in accordance with a preferred embodiment of the present invention.

It is appreciated that the methods of FIGS. 2A and 2B may be implemented in hardware, in software or in a combination of hardware and software. Furthermore, the first processor and the second processor may be identical. Alternatively, the method may be implemented by the system 10 of FIG. 1 in which the first processor may be comprised, for example, in the computer 15, and the second processor may be comprised in the smart card 20, or vice versa.

The methods of FIGS. 2A and 2B, and applications of the methods of FIGS. 2A and 2B are described in Appendix I which is incorporated herein. The applications of the methods of FIGS. 2A and 2B may be employed to modify the basic form of the "Oil and Vinegar" scheme and the HFE scheme thereby to produce the UOV and the HFEV respectively.

Appendix I includes an unpublished article by Aviad Kipnis, Jacques Patarin and Louis Goubin submitted for publication by Springer-Verlag in Proceedings of EUROCRYPT'99 which is scheduled on 2–6 May 1999. The article included in Appendix I also describes variations of the UOV and the HFEV schemes with small signatures.

In the digital signature cryptographic method of FIG. 2A, a set S1 of k polynomial functions is preferably supplied as a public-key (step 100) by a generator of the public-key (not shown) which may be, for example the generator 30 of FIG. 1, the generator 45 of FIG. 1, or an external public-key generator (not shown).

The set S1 preferably includes the functions $P_1(x_1, \ldots, x_{n+v}, y_1, \ldots, y_k), \ldots, P_k(x_1, \ldots, x_{n+v}, y_1, \ldots, y_k)$, where k, v, and n are integers, $x_1, \ldots, x_{n+v}$ are n+v variables of a first type, and $y_1, \ldots, y_k$ are k variables of a second type. The set S1 is preferably obtained by applying a secret key operation on a set S2 of k polynomial functions $P'_1(a_1, \ldots, a_{n+v}, y_1, \ldots, y_k), \ldots, P'_k(a_1, \ldots, a_{n+v}, y_1, \ldots, y_k)$ where $a_1, \ldots, a_{n+v}$ are n+v variables which include a set of n "oil" variables $a_1, \ldots, a_n$, and a set of v "vinegar" variables $a_{n+1}, \ldots, a_{n+v}$. It is appreciated that the secret key operation may include a secret affine transformation s on the n+v variables $a_1, \ldots, a_{n+v}$.

The terms "oil" variables and "vinegar" variables refer to "oil" variables and "vinegar" variables as defined in the basic form of the "Oil and Vinegar" scheme of Jacques Patarin which is described in the above mentioned article titled "The Oil and Vinegar Signature Scheme" presented at the Dagstuhl Workshop on Cryptography in September 1997.

Preferably, when a message to be signed is provided (step 105), a signer may apply a hash function on the message to produce a series of k values $b_1, \ldots, b_k$ (step 110). The signer may be, for example, the generator 30 or the generator 45 of FIG. 1. The series of k values $b_1, \ldots, b_k$ is preferably substituted for the variables $y_1, \ldots, y_k$ of the set S2 respectively so as to produce a set S3 of k polynomial functions $P''_1(a_1, \ldots, a_{n+v}), \ldots, P''_k(a_1, \ldots, a_{n+v})$ (step 115). Then, v values $a'_{n+1}, \ldots, a'_{n+v}$ may be randomly selected for the v "vinegar" variables $a_{n+1}, \ldots, a_{n+v}$ (step 120).

Alternatively, the v values $a'_{n+v}, \ldots, a'_{n+v}$ may be selected according to a predetermined selection algorithm.

Once the v values $a'_{n+1}, \ldots, a'_{n+v}$ are selected, a set of equations $P''_1(a_1, \ldots, a_n, a'_{n+1}, a'_{n+v})=0, \ldots, P''_k(a_1, \ldots, a_n, a'_{n+1}, \ldots, a'_{n+v})=0$ is preferably solved to obtain a solution for $a'_1, \ldots, a'_n$ (step 125). Then, the secret key operation may be applied to transform $a'_1, \ldots, a'_{n+v}$ to a digital signature $e_1, \ldots, e_{n+v}$ (step 130).

The generated digital signature $e_1, \ldots, e_{n+v}$ may be verified according to the method described with reference to FIG. 2B by a verifier of the digital signature (not shown) which may include, for example, the verifier 35 or the verifier 50 of FIG. 1. In order to verify the digital signature, the verifier preferably obtains the signature $e_1, \ldots, e_{n+v}$, the message, the hash function and the public key (step 200). Then, the verifier may apply the hash function on the message to produce the series of k values $b_1, \ldots, b_k$ (step 205). Once the k values $b_1, \ldots, b_k$ are produced, the verifier preferably verifies the digital signature by verifying that the equations $P_1(e_1, \ldots, e_{n+v}, \ldots, b_k)=0, \ldots, P_k(e_1, \ldots, e_{n+v}, b_1, \ldots, b_k)=0$ are satisfied (step 210).

It is appreciated that the generation and verification of the digital signature as mentioned above may be used for the UOV by allowing the set S2 to include the set S of k polynomial functions of the UOV scheme as described in Appendix I. Alternatively, the generation and verification of the digital signature as mentioned above may be used for the HFEV by allowing the set S2 to include the set f(a) of k polynomial functions of the HFEV scheme as described in Appendix I.

As mentioned in Appendix I, the methods of FIGS. 2A and 2B enable obtaining of digital signatures which are typically smaller than digital signatures obtained in conventional number theoretic cryptography schemes, such as the well known RSA scheme.

In accordance with a preferred embodiment of the present invention, when the set S2 includes the set S of k polynomial functions of the UOV scheme, the set S1 may be supplied with the number v of "vinegar" variables being selected to be greater than the number n of "oil" variables. Preferably, v may be also selected such that $q^v$ is greater than $2^{32}$, where q is the number of elements of a finite field K over which the sets S1, S2 and S3 are provided.

Further preferably, the S1 may be obtained from a subset S2' of k polynomial functions of the set S2, the subset S2' being characterized by that all coefficients of components involving any of the $y_1, \ldots, y_k$ variables in the k polynomial functions $P'_1(a_1, \ldots, y_k), \ldots, P'_k(a_1, \ldots, a_{n+v}, y_1, \ldots, y_k)$ are zero, and the number v of "vinegar" variables is greater than the number n of "oil" variables.

In the basic "Oil and Vinegar" scheme, the number v of "vinegar" variables is chosen to be equal to the number n of "oil" variables. For such a selection of the v variables, Aviad Kipnis, who is one of the inventors of the present invention, and Adi Shamir have shown, in the above mentioned Proceedings of CRYPTO 98, Springer, LNCS no 1462, on pages 257–266, a cryptanalysis of the basic "Oil and Vinegar" signature scheme which renders the basic "Oil and Vinegar" scheme insecure. Additionally, by applying the same method described by Kipnis and Shamir, the basic "Oil and Vinegar" scheme may be shown to be insecure for any number v of "vinegar" variables which is lower than the number n of "oil" variables.

The inventors of the present invention have found, as described in Appendix I, that if the "Oil and Vinegar" scheme is made unbalanced by modifying the "Oil and Vinegar" scheme so that the number v of "vinegar" variables is greater than the number n of "oil" variables, a resulting unbalanced "Oil and Vinegar" (UOV) scheme may be secure.

Specifically, for a UOV of degree 2 and for all values of p other than 2, where p is a characteristic of the field K, p being the additive order of 1, the UOV scheme is considered secure for values of v which satisfy the inequality $q^{(v-n)-1} * n^4 > 2^{40}$. For a UOV of degree 2 and for p=2, the number v of "vinegar" variables may be selected so as to satisfy the inequalities $v < n^2$ and $q^{(v-n)-1} * n^4 > 2^{40}$. It is appreciated that for values of v which are higher than $n^2/2$ but less than or equal to $n^2$, the UOV is also considered secure, and solving the set S1 is considered to be as difficult as solving a random set of k equations. For values of v which are higher than $n^2$, the UOV is believed to be insecure.

Furthermore, for a UOV of degree 3 and for p=2, the UOV scheme is considered secure for values of v which are substantially greater than $n*(1+\sqrt{3})$ and lower than or equal to $n^3/6$. It is appreciated that for values of v which are higher than $n^3/6$ but lower than or equal to $n^3/2$, the UOV is also considered secure, and solving the set S1 is considered to be as difficult as solving a random set of k equations. For values of v which are higher than $n^3/2$, and for values of v which are lower than $n*(1+\sqrt{3})$, the UOV is believed to be insecure.

Additionally, for a UOV of degree 3 and for p other than 2, the UOV scheme is considered secure for values of v which are substantially greater than n and lower than or equal to $n^4$. It is appreciated that for values of v which are higher than $n^3/6$ but lower than or equal to $n^4$, the UOV is also considered secure, and solving the set S1 is considered to be as difficult as solving a random set of k equations. For values of v which are higher than $n^4$, and for values of v which are lower than n, the UOV is believed to be insecure.

Preferably, in a case that the set S2 includes the set f(a) of k polynomial functions of the HFEV scheme, the set S2 may include an expression which includes k functions that are derived from a univariate polynomial. Preferably, the univariate polynomial may include a polynomial of degree less than or equal to 100,000 on an extension field of degree n over K.

Example of parameters selected for the UOV and the HFEV schemes are shown in Appendix I.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

APPENDIX I

Unbalanced Oil and Vinegar Signature Schemes

Aviad Kipnis
NDS Technologies
5 Hamarpe St. Har Hotzvim
Jerusalem - Israel
e-mail : akipnis@ndsisrael.com Jacques Patarin, Louis Goubin
Bull SmartCards and Terminals
68 route de Versailles - BP 45
78431 Louveciennes Cedex - France
e-mail : {jacques.patarin,louis.goubin}@bull.net

Abstract

In [9], J. Patarin designed a new scheme, called "oil and vinegar", for computing asymmetric signatures. It is very simple, can be computed very fast (both in secret and public key) and requires very little RAM in smartcard implementations. The idea consists in hiding quadratic equations in $n$ unknowns called "oil" and $v = n$ unknowns called "vinegar" over a finite field $K$, with linear secret functions. This original scheme was broken in [5] by A. Kipnis and A. Shamir. In this paper, we study some very simple variations of the original scheme where $v > n$ (instead of $v = n$). These schemes are called "Unbalanced Oil and Vinegar" (UOV), since we have more "vinegar" unknowns than "oil" unknowns. We show that, when $v \simeq n$, the attack of [5] can be extended, but when $v \geq 2n$ for example, the security of the scheme is still an open problem. Moreover, when $v \simeq \frac{n^2}{2}$, the security of the scheme is exactly equivalent (if we accept a very natural but not proved property) to the problem of solving a random set of $n$ quadratic equations in $\frac{n^2}{2}$ unknowns (with no trapdoor). However, we show that when $v \geq n^2$, finding a solution is generally easy. In this paper, we also present some practical values of the parameters, for which no attacks are known. The length of the signatures can be as short as 192 bits. We also study schemes with public keys of degree three instead of two. We show that no significant advantages exist at the present to recommend schemes of degree three instead of two.

1 Introduction

Since 1985, various authors (see [2], [4], [7], [8], [9], [10], [11] for example) have suggested some public key schemes where the public key is given as a set of multivariate quadratic (or higher degree) equations over a small finite field $K$.

The general problem of solving such a set of equations is NP-hard (cf [3]) (even in the quadratic case). Moreover, when the number of unknowns is, say, $n \geq 16$, the best known algorithms are often not significantly better than exhaustive search (when $n$ is very small, Gröbner bases algorithms might be efficient).

The schemes are often very efficient in terms of speed or RAM required in a smartcard implementation (however, the length of the public key is generally $\geq 1$ Kbyte). The most serious problem is that, in order to introduce a trapdoor (to allow the computation of signatures or to allow the decryption of messages when a secret is known), the generated set of public equations generally becomes a small subset of all the possible equations and, in many cases, the algorithms have been broken. For example [2] was broken by their authors, and [7] and [9] were broken. However, many schemes are still not broken (for example [8], [10], [11]), and also in many cases, some very simple variations have been suggested in order to repair the schemes. Therefore, at the present, we do not know whether this idea of designing public key algorithms with multivariate polynomials over finite fields is a very powerful idea (where only some too simple schemes are insecure) or not.

In this paper, we present what may be the most simple example: the original Oil and Vinegar signature scheme (of [9]) was broken (see [5]), but if we have significantly more "vinegar" unknowns than "oil" unknowns (a definition of the "oil" and "vinegar" unknowns can be found in section 2), then the attack of [5] does not work and the security of this more general scheme is still an open problem.

Moreover, we show that, when we have approximately $\frac{n^2}{2}$ vinegar unknowns for $n$ oil unknowns, the security of the scheme is exactly equivalent (if we accept a natural but not proved property) to the problem of solving a random set of $n$ quadratic equations in $\frac{n^2}{2}$ unknowns (with no trapdoor). This is a nice result, since it suggests that some partial proof of security (related to some simple to describe and supposed very difficult to solve problems) might be found for some schemes with multivariate polynomials over a finite field. However, we show that most of the systems of $n$ quadratic equations in $n^2$ (or more) variables can be solved in polynomial complexity... We also study Oil and Vinegar schemes of degree three (instead of two).

2 The (Original and Unbalanced) Oil and Vinegar of degree two

Let $K = \mathbf{F}_q$ be a small finite field (for example $K = \mathbf{F}_2$). Let $n$ and $v$ be two integers. The message to be signed (or its hash) is represented as an element of $K^n$, denoted by $y = (y_1, ..., y_n)$. Typically, $q^n \simeq 2^{128}$. The signature $x$ is represented as an element of $K^{n+v}$ denoted by $x = (x_1, ..., x_{n+v})$.

Secret key

The secret key is made of two parts:

1. A bijective and affine function $s : K^{n+v} \to K^{n+v}$. By "affine", we mean that each component of the output can be written as a polynomial of degree one in the $n + v$ input unknowns, and with coefficients in $K$.

2. A set $(S)$ of $n$ equations of the following type:

$$\forall i,\ 1 \le i \le n,\ y_i = \sum \gamma_{ijk} a_j a'_k + \sum \lambda_{ijk} a'_j a'_k + \sum \xi_{ij} a_j + \sum \xi'_{ij} a'_j + \delta_i \qquad (S).$$

The coefficients $\gamma_{ijk}$, $\lambda_{ijk}$, $\xi_{ij}$, $\xi'_{ij}$ and $\delta_i$ are the secret coefficients of these $n$ equations. The values $a_1, ..., a_n$ (the "oil" unknowns) and $a'_1, ..., a'_v$ (the "vinegar" unknowns) lie in $K$. Note that these equations $(S)$ contain no terms in $a_i a_j$.

Public key

Let $A$ be the element of $K^{n+v}$ defined by $A = (a_1, ..., a_n, a'_1, ..., a'_v)$. $A$ is transformed into $x = s^{-1}(A)$, where $s$ is the secret, bijective and affine function from $K^{n+v}$ to $K^{n+v}$. Each value $y_i$, $1 \le i \le n$, can be written as a polynomial $P_i$ of total degree two in the $x_j$ unknowns, $1 \le j \le n + v$. We denote by $(\mathcal{P})$ the set of these $n$ equations:

$$\forall i,\ 1 \le i \le n,\ y_i = P_i(x_1, ..., x_{n+v}) \qquad (\mathcal{P}).$$

These $n$ quadratic equations $(\mathcal{P})$ (in the $n + v$ unknowns $x_j$) are the public key.

Computation of a signature (with the secret key)

The computation of a signature $x$ of $y$ is performed as follows:

Step 1: We find $n$ unknowns $a_1, ..., a_n$ of $K$ and $v$ unknowns $a'_1, ..., a'_v$ of $K$ such that the $n$ equations $(S)$ are satisfied.

This can be done as follows: we randomly choose the $v$ vinegar unknowns $a'_i$, and then we compute the $a_i$ unknowns from $(S)$ by Gaussian reductions (because – since there are no $a_i a_j$ terms – the $(S)$ equations are affine in the $a_i$ unknowns when the $a'_i$ are fixed.

Remark: If we find no solution, then we simply try again with new random vinegar unknowns. After very few tries, the probability of obtaining at least one solution is very high, because the probability for a $n \times n$ matrix over $F_q$ to be invertible is not negligible. (It is exactly $(1 - \frac{1}{q})(1 - \frac{1}{q^2})...(1 - \frac{1}{q^{n-1}})$. For $q = 2$, this gives approximately 30 %, and for $q > 2$, this probability is even larger.)

Step 2: We compute $x = s^{-1}(A)$, where $A = (a_1, ..., a_n, a'_1, ..., a'_v)$. $x$ is a signature of $y$.

Public verification of a signature

A signature $x$ of $y$ is valid if and only if all the $(\mathcal{P})$ are satisfied. As a result, no secret is needed to check whether a signature is valid: this is an asymmetric signature scheme.

Note: The name "Oil and Vinegar" comes from the fact that – in the equations $(\mathcal{S})$ – the "oil unknowns" $a_i$ and the "vinegar unknowns" $a'_j$ are not all mixed together: there are no $a_i a_j$ products. However, in $(\mathcal{P})$, this property is hidden by the "mixing" of the unknowns by the $s$ transformation. Is this property "hidden enough" ? In fact, this question exactly means: "is the scheme secure ?". When $v = n$, we call the scheme "Original Oil and Vinegar", since this case was first presented in [9]. This case was broken in [5]. It is very easy to see that the cryptanalysis of [5] also works, exactly in the same way, when $v < n$. However, the cases $v > n$ are much more difficult. When $v > n$, we call the scheme "Unbalanced Oil and Vinegar". The analysis of such schemes is the topic of this paper.

3  A short description of the attack of [5]: cryptanalysis of the case $v = n$ The idea of the attack of [5] is essentially the following:
In order to separate the oil variables and the vinegar variables, we look at the quadratic forms of the $n$ public equations of $(\mathcal{P})$, we omit for a while the linear terms. Let $G_i$ for $1 \leq i \leq n$ be the respective matrix of the quadratic form of $P_i$ of the public equations $(\mathcal{P})$.
The quadratic part of the equations in the set $(\mathcal{S})$ is represented as a quadratic form with a corresponding $2n \times 2n$ matrix of the form : $\begin{pmatrix} 0 & A \\ B & C \end{pmatrix}$, the upper left $n \times n$ zero submatrix is due to the fact that an oil variable is not multiplied by an oil variable.
After hiding the internal variables with the linear function $s$, we get a representation for the matrices $G_i = S \begin{pmatrix} 0 & A_i \\ B_i & C_i \end{pmatrix} S^t$, where $S$ is an invertible $2n \times 2n$ matrix.

Definition 3.1: We define the oil subspace to be the linear subspace of all vectors in $K^{2n}$ whose second half contains only zeros.

Definition 3.2: We define the vinegar subspace as the linear subspace of all vectors in $K^{2n}$ whose first half contains only zeros.

Lemma 1 *Let $E$ and $F$ be a $2n \times 2n$ matrices with an upper left zero $n \times n$ submatrix. If $F$ is invertible then the oil subspace is an invariant subspace of $EF^{-1}$.*

Proof: $E$ and $F$ map the oil subspace into the vinegar subspace. If $F$ is invertible, then this mapping between the oil subspace and the vinegar subspace is one to one and onto (here we use the assumption that $v = n$). Therefore $F^{-1}$ maps back the vinegar subspace into the oil subspace this argument explains why the oil subspace is transformed into itself by $EF^{-1}$.

Definition 3.4: For an invertible matrix $G_j$, define $G_{ij} = G_i G_j^{-1}$.

Definition 3.5: Let $O$ be the image of the oil subspace by $S^{-1}$.
In order to find the oil subspace, we use the following theorem:

Theorem 3.1 $O$ is a common invariant subspace of all the matrices $G_{ij}$.

Proof:

$$G_i G_j^{-1} = S \begin{pmatrix} 0 & A_i \\ B_i & C_i \end{pmatrix} S^t (S^t)^{-1} \begin{pmatrix} 0 & A_j \\ B_j & C_j \end{pmatrix}^{-1} S^{-1} = S \begin{pmatrix} 0 & A_i \\ B_i & C_i \end{pmatrix} \begin{pmatrix} 0 & A_j \\ B_j & C_j \end{pmatrix}^{-1} S^{-1}$$

The two inner matrices have the form of $E$ and $F$ in lemma 1. Therefore, the oil subspace is an invariant subspace of the inner term and $O$ is an invariant subspace of $G_i G_j^{-1}$.
The problem of finding common invariant subspace of set of matrices is studied in [5]. Applying the algorithms in [5] gives us $O$. We then pick $V$ to be an arbitrary subspace of dimension $n$ such that $V + O = K^{2n}$, and they give an equivalent oil and vinegar separation.
Once we have such a separation, we bring back the linear terms that were omitted, we pick random values for the vinegar variables and left with a set of $n$ linear equations with $n$ oil variables.

Note: Lemma 1 is not true any more when $v > n$. The oil subspace is still mapped by $E$ and $F$ into the vinegar subspace. However $F^{-1}$ does not necessary maps the image by $E$ of the oil subspace back into the oil subspace and this is why the cryptanalysis of the original oil and vinegar is not valid for the unbalanced case.
This corresponds to the fact that, if the submatrix of zeros in the top left corner of $F$ is smaller than $n \times n$, then $F^{-1}$ does not have (in general) a submatrix of zeros in the bottom right corner. For example:

$$\begin{pmatrix} 0 & 3 & 1 \\ 1 & 2 & 2 \\ 2 & 1 & 2 \end{pmatrix}^{-1} = \frac{1}{3} \begin{pmatrix} 2 & -5 & 4 \\ 2 & -2 & 1 \\ -3 & 6 & -3 \end{pmatrix}.$$

However, when $v - n$ is small, we see in the next section how to extend the attack.

4 Cryptanalysis when $v > n$ and $v \simeq n$

In this section, we discuss the case of Oil and Vinegar schemes where $v > n$, although a direct application of the attack described in [5] and in the previous section does not solve the problem, a modification of the attack exists, that is applicable as long as $v - n$ is small.

Definition 4.1: We define in this section the oil subspace to be the linear subspace of all vectors in $K^{n+v}$ whose last $v$ coordinates are only zeros.

Definition 4.2: We define in this section the vinegar subspace to be the linear subspace of all vectors in $K^{n+v}$ whose first $n$ coordinates are only zeros.

Here in this section, we start with the homogeneous quadratic terms of the equations: we omit the linear terms for a while.
The matrices $G_i$ have the representation $$G_i = S \begin{pmatrix} 0 & A_i \\ B_i & C_i \end{pmatrix} S^t$$

where the upper left matrix is the $n \times n$ zero matrix, $A_i$ is a $n \times v$ matrix, $B_i$ is a $v \times n$ matrix, $C_i$ is a $v \times v$ matrix and $S$ is a $(n + v) \times (n + v)$ invertible linear matrix.

Definition 4.3: Define $E_i$ to be $\begin{pmatrix} 0 & A_i \\ B_i & C_i \end{pmatrix}$.

Lemma 2 *For any matrix $E$ that has the form* $\begin{pmatrix} 0 & A \\ B & C \end{pmatrix}$, *the following holds:* a) *$E$ transforms the oil subspace into the vinegar subspace.* b) *If the matrix $E^{-1}$ exists, then the image of the vinegar subspace by $E^{-1}$ is a subspace of dimension $v$ which contains the $n$-dimensional oil subspace in it.*

Proof: a) follows directly from the definition of the oil and vinegar subspaces. When a) is given then b) is immediate.

The algorithm we propose is a probabilistic algorithm. It looks for an invariant subspace of the oil subspace after it is transformed by $S$. The probability for the algorithm to succeed on the first try is small. Therefore we need to repeat it with different inputs. We use the following property: any linear combination of the matrices $E_1, ..., E_n$ is also of the form $\begin{pmatrix} 0 & A \\ B & C \end{pmatrix}$.

The following theorem explains why an invariant subspace may exist with a certain probability.

Theorem 4.1 *Let $F$ be an invertible linear combination of the matrices $E_1, ..., E_n$. Then for any $k$ such that $E_k^{-1}$ exists, the matrix $FE_k^{-1}$ has a non trivial invariant subspace which is also a subspace of the oil subspace, with probability not less than $\frac{q-1}{q^{2d}-1}$ for $d = v - n$.*

Proof: The matrix $F$ maps the oil subspace into the vinegar subspace, the image by $F$ of the oil subspace is mapped by $E_k^{-1}$ into a subspace of dimension $v$ that contains the oil subspace – these are due to lemma 1. We write $v = n + d$, where $d$ is a small integer. The oil subspace and its image by $FE_k^{-1}$ are two subspaces with dimension $n$ that reside in a subspace of dimension $n + d$. Therefore, their intersection is a subspace of the oil subspace with dimension not less than $n - d$. We denote the oil subspace by $I_0$ and the intersection subspace by $I_1$. Now, we take the inverse images by $FE_k^{-1}$ of $I_1$: this is a subspace of $I_0$ (the oil subspace) with dimension not less than $n - d$ and the intersection between this subspace and $I_1$ is a subspace of $I_1$ with dimension not less than $n - 2d$. We call this subspace $I_2$. We can continue this process and define $I_\ell$ to be the intersection of $I_{\ell-1}$ and its inverse image by $FE_k - 1$. These two subspaces have co-dimension not more than $d$ in $I_{\ell-2}$. Therefore, $I_\ell$ has a co-dimension not more than $2d$ in $I_{\ell-2}$ or a co-dimension not more than $d$ in $I_{\ell-1}$. We can carry on this process as long as we are sure that the inverse image by $FE_k^{-1}$ of $I_\ell$ has a non trivial intersection with $I_\ell$. This is ensured as long as the dimension of $I_\ell$ is greater than $d$, but when the dimension is $d$ or less than $d$, there is no guaranty that these two subspaces – that reside in $I_{\ell-1}$ – have a non trivial intersection. We end the process with $I_\ell$ that has dimension $\leq d$ that resides in $I_{\ell-1}$ with dimension not more than $2d$.

We know that the transformation $(EG_k^{-1})^{-1}$ maps $I_\ell$ into $I_{\ell-1}$. With probability not less than $\frac{q-1}{q^{2d}-1}$, there is a non zero vector in $I_\ell$ that is mapped to a non zero mutiple of itself – and therefore there is a non trivial subspace of $FE_k - 1$ which is also a subspace of the oil subspace.

Note: It is possible to get a better result for the expected number of eigenvectors and with much less effort: $I_1$ is a subspace with dimension not less than $n - d$ and is mapped by $FE_k^{-1}$ into a subspace with dimension $n$. The probability for a non zero vector to be mapped to a non zero multiple of itself is $\frac{q-1}{q^n-1}$. To get the expected value, we multiply it by the number of non zero vectors in $I_1$. It gives a value which is not less than $\frac{(q-1)(q^{n-d}-1)}{q^n-1}$. Since every eigenvector is counted $q - 1$ times, then the expected number of invariant subspcaes of dimension 1 is not less than $\frac{q^{n-d}-1}{q^n-1} \sim q^{-d}$.

We define $O$ as in section 3 and we get the following result for $O$:

Theorem 4.2 *Let $F$ be an invertible linear combination of the matrices $G_1, ..., G_n$. Then for any $k$ such that $G_k^{-1}$ exists, the matrix $FG_k^{-1}$ has a non trivial invariant subspace, which is also a subspace of $O$ with probability not less than $\frac{q-1}{q^{2d}-1}$ for $d = v - n$.*

Proof:

$$FG_k^{-1} = (\alpha_1 G_1 + ... + \alpha_n G_n)G_k^{-1} = S(\alpha_1 E_1 + ... + \alpha_n E_n)S^t(S^t)^{-1}E_k^{-1}S^{-1} = S(\alpha_1 E_1 + ... + \alpha_n E_n)E_k^{-1}S^{-1}.$$

The inner term is an invariant subspace of the oil subspace with the required probability. Therefore, the same will hold for $FG_k^{-1}$, but instead of a subspace of the oil subspace, we get a subspace of $O$.

How to find $O$ ?

We take a random linear combination of $G_1, ..., G_n$ and multiply it by an inverse of one of the $G_k$ matrices. Then we calculate all the minimal invariant subspaces of this matrix (a minimal invariant subspace of a matrix $A$ contains no non trivial invariant subspaces of the matrix $A$ – these subspaces corresponds to irreducible factors of the characteristic polynomial of $A$). This can be done in probabilistic polynomial time using standard linear algebra techniques. This matrix may have an invariant subspace wich is a subspace of $O$.

The following lemma enables us to distinguish between subspaces that are contained in $O$ and random subspaces.

Lemma 3 *If $H$ is a linear subspace and $H \subset O$, then for every $x, y$ in $H$ and every $i$, $G_i(x,y) = 0$ (here we regard $G_i$ as a bilinear form).*

Proof: There are $x'$ and $y'$ in the oil subspace such that $x' = xS^{-1}$ and $y' = yS^{-1}$.

$$Gi(x,y) = xS \begin{pmatrix} 0 & A_i \\ B_i & C_i \end{pmatrix} S^t y^t = (x'S^{-1})S \begin{pmatrix} 0 & A_i \\ B_i & C_i \end{pmatrix} ((y'S^{-1})S)^t = x' \begin{pmatrix} 0 & A_i \\ B_i & C_i \end{pmatrix} (y')^t = 0.$$

The last term is zero because $x'$ and $y'$ are in the oil subspace.

This lemma gives a polynomial test to distinguish between subspaces of $O$ and random subspaces.
If the matrix we used has no minimal subspace which is also a subspace of $O$, then we pick another linear combination of $G_1, ..., G_n$, multiply it by an inverse of one of the $G_k$ matrices and try again.

After repeating this process approximately $q^{-d+1}$ times, we find with good probability at least one zero vector of $O$. We continue the process until we get $n$ independent vectors of $O$. These vectors span $O$. The expected complexity of the process is proportional to $q^{-d+1}n^4$. We use here the expected number of tries until we find a non trivial invariant subspace and the term $n^4$ covers the computational linear algebra operations we need to perform for evey try.

5  The cases $v \simeq \frac{n^2}{2}$ (or $v \geq \frac{n^2}{2}$)

Property

Let $(\mathcal{A})$ be a random set of $n$ quadratic equations in $(n+v)$ variables $x_1, ..., x_{n+v}$. (By "random" we mean that the coefficients of these equations are uniformly and randomly chosen). When $v \simeq \frac{n^2}{2}$ (and more generally when $v \geq \frac{n^2}{2}$), there is probably – for most of such $(\mathcal{A})$ – a linear change of variables $(x_1, ..., x_{n+v}) \mapsto (x'_1, ..., x'_{n+v})$ such that the set $(\mathcal{A}')$ of $(\mathcal{A})$ equations written in $(x'_1, ..., x'_{n+v})$ is an "Oil and Vinegar" system (i.e. there are no terms in $x'_i \cdot x'_j$ with $i \leq n$ and $j \leq n$).

An argument to justify the property

Let $$\begin{cases} x_1 = \alpha_{1,1}x'_1 + \alpha_{1,2}x'_2 + ... + \alpha_{1,n+v}x'_{n+v} \\ \vdots \\ x_{n+v} = \alpha_{n+v,1}x'_1 + \alpha_{n+v,2}x'_2 + ... + \alpha_{n+v,n+v}x'_{n+v} \end{cases}$$

By writing that the coefficient in all the $n$ equations of $(\mathcal{A})$ of all the $x'_i \cdot x'_j$ ($i \leq n$ and $j \leq n$) is zero, we obtain a system of $n \cdot n \cdot \frac{n+1}{2}$ quadratic equations in the $(n+v) \cdot n$ variables $\alpha_{i,j}$ ($1 \leq i \leq n+v$, $1 \leq j \leq n$). Therefore, when $v \geq$ approximately $\frac{n^2}{2}$, we may expect to have a solution for this system of equations for most of $(\mathcal{A})$.

Remarks:

1. This argument is very natural, but this is not a complete mathematical proof.

2. The system may have a solution, but finding the solution might be a difficult problem. This is why an Unbalanced Oil and Vinegar scheme might be secure (for well chosen parameters): there is always a linear change of variables that makes the problem easy to solve, but finding such a change of variables might be difficult.

3. In section 7, we will see that, despite the result of this section, it is not recommended to choose $v \geq n^2$.

6 Solving a set of $n$ quadratic equations in $k$ unknowns, $k > n$, is NP-hard We present in section 7 an algorithm that solves in polynomial complexity more than 99% of the sets of $n$ quadratic equations in $n^2$ (or more) variables (i.e. it will probably succeed in more than 99% of the cases when the coefficients are randomly chosen).

Roughly speaking, we can summarize this result by saying that solving a "random" set of $n$ quadratic equations in $n^2$ (or more) variables is feasible in polynomial complexity (and thus is not NP-hard if $P \neq NP$). However, we see in the present section that the problem of solving any (i.e. 100%) set of $n$ quadratic equations in $k \geq n$ variables (so for example in $k = n^2$ variables) is NP-hard !

To see this, let us assume that we have a black box that takes any set of $n$ quadratic equations with $k$ variables in input, and that gives one solution when at least one solution exists. Then we can use this black box to find a solution for any set of $n$ quadratic equations in $n$ variables (and this is NP-hard). We proceed (for example) as follows. Let $(\mathcal{A})$ be a set of $(n-1)$ quadratic equations with $(n-1)$ variables $x_1, x_2, ..., x_{n-1}$. Then let $y_1, ..., y_\alpha$ be $\alpha$ more variables.

Let $(\mathcal{B})$ be the set of $(\mathcal{A})$ equations plus one quadratic equation in $y_1, ..., y_\alpha$ (for example the equation: $(y_1 + ... + y_\alpha)^2 = 1$). Then $(\mathcal{B})$ is a set of exactly $n$ quadratic equations in $(n + 1 + \alpha)$ variables. It is clear that from the solution of $(\mathcal{B})$ we will immediately find one solution for $(\mathcal{A})$.

Note 1:  $(\mathcal{B})$ has a very special shape ! This is why there is a polynomial algorithm for 99% of the equations without contradicting the fact that solving these sets $(\mathcal{B})$ of equations is a NP-hard problem.

Note 2:  For $(\mathcal{B})$, we can also add more than one quadratic equations in the $y_i$ variables and we can linearly mix these equations with the equations of $(\mathcal{A})$. In this case, $(\mathcal{B})$ is still of very special form but this very special form is less obvious at first glance since all the variables $x_i$ and $y_j$ are in all the equations of $(\mathcal{B})$.

7 A generally efficient algorithm for solving a random set of $n$ quadratic equations in $n^2$ (or more) unknowns In this section, we describe an algorithm that solves a system of $n$ randomly chosen quadratic equations in $n + v$ variables, when $v \geq n^2$.

Let $(S)$ be the following system:

$$(S) \begin{cases} \sum_{1 \leq i \leq j \leq n+v} a_{ij1} x_i x_j + \sum_{1 \leq i \leq n+v} b_{i1} x_i + \delta_1 = 0 \\ \vdots \\ \sum_{1 \leq i \leq j \leq n+v} a_{ijn} x_i x_j + \sum_{1 \leq i \leq n+v} b_{in} x_i + \delta_n = 0 \end{cases}$$

The main idea of the algorithm consists in using a change of variables such as:

$$\begin{cases} x_1 = \alpha_{1,1} y_1 + \alpha_{2,1} y_2 + ... + \alpha_{n,1} y_n + \alpha_{n+1,1} y_{n+1} + ... + \alpha_{n+v,1} y_{n+v} \\ \vdots \\ x_{n+v} = \alpha_{1,n+v} y_1 + \alpha_{2,n+v} y_2 + ... + \alpha_{n,n+v} y_n + \alpha_{n+1,n+v} y_{n+1} + ... + \alpha_{n+v,n+v} y_{n+v} \end{cases}$$

whose $\alpha_{i,j}$ coefficients (for $1 \leq i \leq n$, $1 \leq j \leq n+v$) are found step by step, in order that the resulting system $(S')$ (written with respect to these new variables $y_1, ..., y_{n+v}$) is easy to solve.

- We begin by choosing randomly $\alpha_{1,1}, ..., \alpha_{1,n+v}$.

- We then compute $\alpha_{2,1}, ..., \alpha_{2,n+v}$ such that $(S')$ contains no $y_1 y_2$ terms. This condition leads to a system of $n$ *linear* equations on the $(n+v)$ unknowns $\alpha_{2,j}$ ($1 \leq j \leq n+v$):

$$\sum_{1 \leq i \leq j \leq n+v} a_{ijk} \alpha_{1,i} \alpha_{2,j} = 0 \qquad (1 \leq k \leq n).$$

- We then compute $\alpha_{3,1}, ..., \alpha_{3,n+v}$ such that $(S')$ contains neither $y_1 y_3$ terms, nor $y_2 y_3$ terms. This condition is equivalent to the following system of $2n$ *linear* equations on the $(n+v)$ unknowns $\alpha_{3,j}$ ($1 \leq j \leq n+v$):

$$\begin{cases} \sum_{1 \leq i \leq j \leq n+v} a_{ijk} \alpha_{1,i} \alpha_{3,j} = 0 & (1 \leq k \leq n) \\ \sum_{1 \leq i \leq j \leq n+v} a_{ijk} \alpha_{2,i} \alpha_{3,j} = 0 & (1 \leq k \leq n) \end{cases}$$

- ...

- Finally, we compute $\alpha_{n,1}, ..., \alpha_{n,n+v}$ such that $(S')$ contains neither $y_1 y_n$ terms, nor $y_2 y_n$ terms, ..., nor $y_{n-1} y_n$ terms. This condition gives the following system of $(n-1)n$ *linear* equations on the $(n+v)$ unknowns $\alpha_{n,j}$ ($1 \leq j \leq n+v$):

$$\begin{cases} \sum_{1 \leq i \leq j \leq n+v} a_{ijk} \alpha_{1,i} \alpha_{n,j} = 0 & (1 \leq k \leq n) \\ \vdots \\ \sum_{1 \leq i \leq j \leq n+v} a_{ijk} \alpha_{n-1,i} \alpha_{n,j} = 0 & (1 \leq k \leq n) \end{cases}$$

In general, all these linear equations provide at least one solution (found by Gaussian reductions). In particular, the last system of $n(n-1)$ equations and $(n+v)$ unknowns generally gives a solution, as soon as $n+v > n(n-1)$, i.e. $v > n(n-2)$, which is true by hypothesis.

Moreover, the $n$ vectors $\begin{pmatrix} \alpha_{1,1} \\ \vdots \\ \alpha_{1,n+v} \end{pmatrix}, ..., \begin{pmatrix} \alpha_{n,1} \\ \vdots \\ \alpha_{n,n+v} \end{pmatrix}$ are very likely to be linearly independent for a random quadratic system $(S)$.

The remaining $\alpha_{i,j}$ constants (i.e. those with $n+1 \leq i \leq n+v$ and $1 \leq j \leq n+1$) are randomly chosen, so as to obtain a *bijective* change of variables.

By rewriting the system $(S)$ with respect to these new variables $y_i$, we are led to the following system:

$$(S') \begin{cases} \sum_{i=1}^{n} \beta_{i,1} y_i^2 + y_1 L_{1,1}(y_{n+1}, ..., y_{n+v}) + ... + y_n L_{n,1}(y_{n+1}, ..., y_{n+v}) + Q_1(y_{n+1}, ..., y_{n+v}) = 0 \\ \vdots \\ \sum_{i=1}^{n} \beta_{i,n} y_i^2 + y_1 L_{1,n}(y_{n+1}, ..., y_{n+v}) + ... + y_n L_{n,n}(y_{n+1}, ..., y_{n+v}) + Q_n(y_{n+1}, ..., y_{n+v}) = 0 \end{cases}$$

where each $L_{i,j}$ is an affine function and each $Q_i$ is a quadratic function.

We then compute $y_{n+1}, ..., y_{n+v}$ such that:

$$\forall i, \ 1 \leq i \leq n, \ \forall j, \ 1 \leq j \leq n+v, \ L_{i,j}(y_{n+1}, ..., y_{n+v}) = 0.$$

This is possible because we have to solve a system of $n^2$ equations and $v$ unknowns, which generally provides at least one solution, as long as $v \geq n^2$.

It remains to solve the following system of $n$ equations on the $n$ unknowns $y_1, ..., y_n$:

$$(S'') \begin{cases} \sum_{i=1}^{n} \beta_{i1} y_i^2 = \lambda_1 \\ \vdots \\ \sum_{i=1}^{n} \beta_{in} y_i^2 = \lambda_n \end{cases}$$

where $\lambda_k = -Q_k(y_{n+1}, ..., y_{n+v})$ $(1 \leq k \leq n)$.
In general, this gives the $y_i^2$ by Gaussian reduction.

8 A variation with twice smaller signatures

In the UOV described in section 2, the public key is a set of $n$ quadratic equations $y_i = P_i(x_1, ..., x_{n+v})$, for $1 \leq i \leq n$, where $y = (y_1, ..., y_n)$ is the hash value of the message to be signed. If we use a collision-free hash function, the hash value must at least be 128 bits long. Therefore, $q^n$ must be at least $2^{128}$, so that the typical length of the signature, if $v = 2n$, is at least $3 \times 128 = 384$ bits.

As we see now, it is possible to make a small variation in the signature design in order to obtain twice smaller signatures. The idea is to keep the same polynomial $P_i$ (with the same associated secret key), but now the public equations that we check are:

$$\forall i, \; P_i(x_1, ..., x_{n+v}) + L_i(y_1, ..., y_n, x_1, ..., x_{n+v}) = 0,$$

where $L_i$ is a linear function in $(x_1, ..., x_{n+v})$ and where the coefficients of $L_i$ are generated by a hash function in $(y_1, ..., y_n)$.
For example $L_i(y_1, ..., y_n, x_1, ..., x_{n+v}) = \alpha_1 x_1 + \alpha_2 x_2 + ... + \alpha_{n+v} x_{n+v}$, where $(\alpha_1, \alpha_2, ..., \alpha_{n+v}) = \text{Hash}(y_1, ..., y_n || i)$. Now, $n$ can be chosen such that $q^n \geq 2^{64}$ (instead $q^n \geq 2^{128}$). (Note: $q^n$ must be $\geq 2^{64}$ in order to avoid exhaustive search on a solution $x$). If $v = 2n$ and $q^n \simeq 2^{64}$, the length of the signature will be $3 \times 64 = 192$ bits.

9 Oil and Vinegar of degree three

9.1 The scheme

The quadratic Oil and Vinegar schemes described in section 2 can easily be extended to any higher degree. We now present the schemes in degree three.

Variables
Let $K$ be a small finite field (for example $K = F_2$). Let $a_1, ..., a_n$ be $n$ elements of $K$, called the "oil" unknowns. Let $a'_1, ..., a'_v$ be $v$ elements of $K$, called the "vinegar" unknowns.

Secret key.
The secret key is made of two parts:

1. A bijective and affine function $s : K^{n+v} \to K^{n+v}$.

2. A set $(S)$ of $n$ equations of the following type:

$$\forall i \leq n, \; y_i = \sum \gamma_{ijkl} a_j a'_k a'_l + \sum \mu_{ijkl} a'_j a'_k a'_l + \sum \lambda_{ijk} a'_j a'_k + \sum \nu_{ijk} a_j a'_k + \sum \xi_{ij} a_j + \sum \xi'_{ij} a'_j + \delta_i \quad (S).$$

The coefficients $\gamma_{ijkl}$, $\mu_{ijkl}$, $\lambda_{ijk}$, $\nu_{ijk}$, $\xi_{ij}$, $\xi'_{ij}$ and $\delta_i$ are the secret coefficients of these $n$ equations. Note that these equations $(S)$ contain no terms in $a_j a_k a_l$ or in $a_j a_k$: the equations are affine in the $a_j$ unknowns when the $a'_k$ unknowns are fixed.

Public key

Let $A$ be the element of $K^{n+v}$ defined by $A = (a_1, ..., a_n, a'_1, ..., a'_v)$. $A$ is transformed into $x = s^{-1}(A)$, where $s$ is the secret, bijective and affine function from $K^{n+v}$ to $K^{n+v}$. Each value $y_i$, $1 \leq i \leq n$, can be written as a polynomial $P_i$ of total degree three in the $x_j$ unknowns, $1 \leq j \leq n+v$. We denote by $(\mathcal{P})$ the set of the following $n$ equations:

$$\forall i, \ 1 \leq i \leq n, y_i = P_i(x_1, ..., x_{n+v}) \qquad (\mathcal{P}).$$

These $n$ equations $(\mathcal{P})$ are the public key.

Computation of a signature

Let $y$ be the message to be signed (or its hash value).

Step 1: We randomly choose the $v$ vinegar unknowns $a'_i$, and then we compute the $a_i$ unknowns from $(S)$ by Gaussian reductions (because – since there are no $a_i a_j$ terms – the $(S)$ equations are affine in the $a_i$ unknowns when the $a'_i$ are fixed. (If we find no solution for this affine system of $n$ equations and $n$ "oil" unknowns, we just try again with new random "vinegar" unknowns.)

Step 2: We compute $x = s^{-1}(A)$, where $A = (a_1, ..., a_n, a'_1, ..., a'_v)$. $x$ is a signature of $y$.

Public verification of a signature

A signature $x$ of $y$ is valid if and only if all the $(\mathcal{P})$ are satisfied.

9.2 First cryptanalysis of Oil and Vinegar of degree three when $v \leq n$

We can look at the quadratic part of the public key and attack it exactly as for an Oil and Vinegar of degree two. This is expected to work when $v \leq n$.

Note: If there is no quadratic part (i.e. is the public key is homogeneous of degree three), or if this attack does not work, then it is always possible to apply a random affine change of variables and to try again. Moreover, we will see in section 9.3 that, surprisingly, there is an even easier and more efficient attack in degree three than in degree two!

9.3 Cryptanalysis of Oil and Vinegar of degree three when $v \leq (1+\sqrt{3})n$ and $K$ is of characteristic $\neq 2$ (from an idea of D. Coppersmith, cf [1])

The key idea is to detect a "linearity" in some directions. We search the set $V$ of the values $d = (d_1, ..., d_{n+v})$ such that:

$$\forall x, \forall i, \ 1 \leq i \leq n, \ P_i(x+d) + P_i(x-d) = 2P_i(x) \qquad (\#).$$

By writing that each $x_k$ indeterminate has a zero coefficient, we obtain $n \cdot (n+v)$ quadratic equations in the $(n+v)$ unknowns $d_j$.
(Each monomial $x_j x_k x_\ell$ gives $(x_j + d_j)(x_k + d_k)(x_\ell + d_\ell) + (x_j - d_j)(x_k - d_k)(x_\ell - d_\ell) - 2x_j x_k x_\ell$, i.e. $2(x_j d_k d_\ell + x_k d_j d_\ell + x_\ell d_j d_k)$.)
Furthermore, the cryptanalyst can specify about $n-1$ of the coordinates $d_k$ of $d$, since the vectorial space of the correct $d$ is of dimension $n$. It remains thus to solve $n \cdot (n+v)$ quadratic equations in $(v+1)$ unknowns $d_j$. When $v$ is not too large (typically when $\frac{(v+1)^2}{2} \leq n(n+v)$, i.e. when $v \leq (1+\sqrt{3})n$), this is expected to be easy.
As a result, when $v \leq$ approximately $(1+\sqrt{3})n$ and $|K|$ is odd, this gives a simple way to break the scheme.

Note 1: When $v$ is sensibly greater than $(1+\sqrt{3})n$ (this is a more unbalanced limit than what we had in the quadratic case), we do not know at the present how to break the scheme.

Note 2: Strangely enough, this cryptanalysis of degree three Oil and Vinegar schemes does not work on degree two Oil and Vinegar schemes. The reason is that – in degree two – writing $$\forall x, \forall i, 1 \leq i \leq n, \ P_i(x+d) + P_i(x-d) = 2P_i(x)$$

only gives $n$ equations of degree two on the $(n+v)$ $d_j$ unknowns (that we do not know how to solve). (Each monomial $x_j x_k$ gives $(x_j + d_j)(x_k + d_k) + (x_j - d_j)(x_k - d_k) - 2x_j x_k$, i.e. $2d_j d_k$.)

Note 3: In degree two, we have seen that Unbalanced Oil and Vinegar public keys are expected to cover almost all the set of $n$ quadratic equations when $v \simeq \frac{n^2}{2}$. In degree three, we have a similar property: the public keys are expected to cover almost all the set of $n$ cubic equations when $v \simeq \frac{n^3}{6}$ (the proof is similar).

10 Public key length

It is always feasible to make some easy transformations on a public key in order to obtain the public key in a canonical way such that this canonical expression is slightly shorter than the original expression.

First, it is always possible to publish only the homogeneous part of the quadratic equations (and not the linear part), because if we know the secret affine change of variables, then we can solve $P(x) = y$ in an Oil and Vinegar scheme, we can also solve $P(x) + L(x) = y$, where $L$ is any linear expression with the same affine change of variables. It is thus possible to publish only the homogeneous part $P$ and to choose a convention for computing the linear part $L$ of the public key (instead of publishing $L$). For example, this convention can be that the linear terms of $L$ in the equation number $i$ ($1 \leq i \leq n$) are computed from $\text{Hash}(i||Id)$ (or from $\text{Hash}(i||P)$), where Hash is a public hash function and where $Id$ is the identity of the owner of the secret key.

On the equations, it is also possible to:

1. Make linear and bijective changes of variable $x' = A(x)$.

2. Compute a linear and bijective transformation on the equation: $\mathcal{P}' = t(\mathcal{P})$. (For example, the new first equation can be the old first plus the old third equation, etc).

By combining easily these two transformations, it is always possible to decrease slightly the lenght of the public key.

Idea 1: It is possible to make a change of variables such that the first equation is in a canonical form (see [6], chapter 6). With this presentation of the public key, the length of the public key will be approximately $\frac{n-1}{n}$ times the initial length.

Idea 2: Another idea is to use the idea of section 7, i.e. to create a square of $\lambda \times \lambda$ zeros in the coefficients, where $\lambda \simeq \sqrt{n+v}$. With this presentation, the lenght of the public key is approximately $\frac{(n+v)^2 - (n+v)}{(n+v)^2}$ times the initial length.

Remark: As we will see in section 12, the most efficient way of reducing the length of the public key is to choose carefully the values $q$ and $n$.

11 Summary of the results

The underlying field is $K = \mathbf{F}_q$ with $q = p^m$. Its characteristic is $p$.
"As difficult as random" means that the problem of breaking the scheme is expected to be as difficult as the problem of solving a system of equations in $v$ variables when the coefficients are randomly chosen (i.e. with no trapdoor).

| Degree | Broken | Not Broken | Not broken and as difficult as random | Broken (despite as difficult as random) |
|---|---|---|---|---|
| 2 (for all $p$) | $v \leq n$ | $n \leq v \leq \frac{n^2}{2}$ | $\frac{n^2}{2} \leq v \leq n^2$ | $v \geq n^2$ |
| 3 (for $p = 2$) | $v \leq (1+\sqrt{3})n$ | $(1+\sqrt{3})n \leq v \leq \frac{n^2}{6}$ | $\frac{n^2}{6} \leq v \leq \frac{n^2}{6}$ | $v \geq \frac{n^2}{6}$ |
| 3 (for $p \neq 2$) | $v \leq n$ | $n \leq v \leq \frac{n^2}{6}$ | $\frac{n^2}{6} \leq v \leq n^4$ | $v \geq n^4$ |

In this table, we have summarized our current results on the attacks on Unbalanced Oil and Vinegar schemes. The original paper ([5]) was only studying the case $v = n$ for quadratic equations.

12 Concrete examples of parameters

In all the examples below, we do not know how to break the scheme. We have arbitrary chosen $v = 2n$ (or $v = 3n$) in all these examples (since $v < n$ and $v \geq n^2$ are insecure).

Example 1: $K = F_2$, $n = 128$, $v = 256$ (or $v = 384$). The signature scheme is the one of section 2. The length of the public key is approximately $n \cdot (\frac{(n+v)^2}{2})$ bits. This gives here a huge value: approximately 1.1 Mbytes (or 2 Mbytes) ! The length of the secret key (the $s$ matrix) is approximately $(n+v)^2$ bits, i.e. approximately 18 Kbytes. However, this secret key can always be generated from a small secret seed of, say, 64 bits.

Example 2: $K = F_2$, $n = 64$, $v = 128$ (or $v = 192$). The signature scheme is the one section 8. The length of the public key is 144 Kbytes (or 256 Kbytes).

Example 3: $K = F_{16}$, $n = 16$, $v = 32$ (or $v = 48$). $s$ is a secret affine bijection of $F_{16}$. The signature scheme is the one section 8. The length of the public key is 9 Kbytes (or 16 Kbytes).

Example 4: $K = F_{16}$, $n = 16$, $v = 32$ (or $v = 48$). $s$ is a secret affine bijection of $F_{16}$ such that all its coefficients lie in $F_2$. Moreover, the secret quadratic coefficients are also chosen in $F_2$, so that the public functions $P_i$, $1 \leq i \leq n$, are $n$ quadratic equations in $(n+v)$ unknowns of $F_{16}$, with coefficients in $F_2$. In this case (the signature scheme is still the one of section 8), the length of the public key is 2.2 Kbytes (or 4 Kbytes).

Note: In all these examples, $n \geq 16$ in order to avoid Gröbner bases algorithms to find a solution $x$, and $q^n \geq 2^{64}$ in order to avoid exhaustive search on $x$.

13 Conclusion

The original Oil and Vinegar signature algorithm had a very efficient cryptanalysis (cf [5]). Moreover, we have seen in this paper that Oil and Vinegar schemes are often not more secure in degree three than in degree two. However, surprisingly, some of the very simple variations called "Unbalanced Oil and Vinegar" described in this paper have so far resisted all attacks. The scheme is still very simple, very fast, and its parameters can be chosen in order to have a reasonable size for the public key. Its security is an open problem, but it is interesting to notice that — when the number of "vinegar unknowns" becomes approximately $\frac{n^2}{2}$ (for $n$ "oil unknowns") — then (if we accept a natural property) the scheme is as hard to break as a random set of $n$ quadratic equations in $\frac{n^2}{2}$ unknowns (with no trapdoor). This may give hope to obtain more concrete results of security on multivariate polynomial public key cryptography.

References

[1] D. Coppersmith, *personal communication*, e-mail.

[2] H. Fell, W. Diffie, *Analysis of a public key approach based on polynomial substitutions*, Proceedings of CRYPTO'85, Springer-Verlag, vol. 218, pp. 340-349

[3] M. Garey, D. Johnson, *Computers and Intractability, a Guide to the Theory of NP-Completeness*, Freeman, p. 251.

[4] H. Imai, T. Matsumoto, *Algebraic Methods for Constructing Asymmetric Cryptosystems*, Algebraic Algorithms and Error Correcting Codes (AAECC-3), Grenoble, 1985, Springer-Verlag, LNCS n°229.

[5] A. Kipnis, A. Shamir, *Cryptanalysis of the Oil and Vinegar Signature Scheme*, Proceedings of CRYPTO'98, Springer, LNCS n°1462, pp. 257-266.

[6] R. Lidl, H. Niederreiter, *Finite Fields*, Encyclopedia of Mathematics and its applications, volume 20, Cambridge University Press.

[7] T. Matsumoto, H. Imai, *Public Quadratic Polynomial-tuples for efficient signature-verification and message-encryption*, Proceedings of EUROCRYPT'88, Springer-Verlag, pp. 419-453.

[8] J. Patarin, *Hidden Fields Equations (HFE) and Isomorphisms of Polynomials (IP) : Two New Families of Asymmetric Algorithms*, Proceedings of EUROCRYPT'96, Springer, pp. 33-48.

[9] J. Patarin, *The Oil and Vinegar Signature Scheme*, presented at the Dagstuhl Workshop on Cryptography, september 1997 (transparencies).

[10] J. Patarin, L. Goubin, *Trapdoor One-way Permutations and Multivariate Polynomials*, Proceedings of ICICS'97, Springer, LNCS n°1334, pp. 356-368.

[11] J. Patarin, L. Goubin, *Asymmetric Cryptography with S-Boxes*, Proceedings of ICICS'97, Springer, LNCS n°1334, pp. 369-380.

What is claimed is:

1. A digital signature cryptographic method, performed by a computing device, the method comprising:

supplying a set S1 of k polynomial functions as a public-key, the set S1 including the functions $P_1(x_1, \ldots, x_{n+v}, y_1, \ldots, y_k), \ldots, P_k(x_1, \ldots, x_{n+v}, y_1, \ldots, y_k)$, where k, v, and n are integers, $x_1, \ldots, x_{n+v}$ are n+v variables of a first type, $y_1, \ldots, y_k$ are k variables of a second type, and the set S1 is obtained by applying a secret key operation on a set S2 of k polynomial functions $P'_1(a_1, \ldots, a_{n+v}, y_1, \ldots, y_k), \ldots, P'_k(a_1, \ldots, a_{n+v}, y_1, \ldots, y_k)$ where $a_1, \ldots, a_{n+v}$ are n+v variables which include a set of n "oil" variables $a_1, \ldots, a_n$, and a set of v "vinegar" variables an $a_{n+1}, \ldots, a_{n+v}$, the supplying comprising selecting the number v of "vinegar" variables to be greater than the number n of "oil" variables;

providing a message to be signed;

applying a hash function on the message to produce a series of k values $b_1, \ldots, b_k$;

substituting the series of k values $b_1, \ldots, b_k$ for the variables $y_1, \ldots, y_k$ of the set S2 respectively to produce a set S3 of k polynomial functions $P''_1(a_1, \ldots, a_{n+v}), \ldots, P''_k(a_1, \ldots, a_{n+v})$;

selecting v values $a'_{n+1}, \ldots, a'_{n+v}$ for the v "vinegar" variables $a_{n+1}, \ldots a_{n+v}$;

solving a set of equations $P''_1(a_1, \ldots, a_n, a'_{n+1}, \ldots, a'_{n+v})=0, \ldots, P''_k(a_1, \ldots, a_n, a'_{n+1}, \ldots, a'_{n+v})=0$ to obtain a solution for $a'_1, \ldots, a'_n$;

applying the secret key operation to transform $a'_1, \ldots, a'_{n+v}$ to a digital signature $e_1, \ldots, e_{n+v}$; and assigning $e_1, \ldots, e_{n+v}$ as the digital signature of the message.

2. A method according to claim 1 and also comprising verifying the digital signature.

3. A method according to claim 2 and wherein said verifying comprises:

obtaining the signature $e_1, \ldots, e_{n+v}$, the message, the hash function and the public key;

applying the hash function on the message to produce the series of k values $b_1, \ldots, b_k$; and verifying that the equations $P_1(e_1, \ldots, e_{n+v}, b_1, \ldots, b_k)=0, \ldots, P_k(e_1, \ldots, e_{n+v}, b_1, \ldots, b_k)=0$ are satisfied.

4. A method according to claim 1 and wherein the method comprises an HFEV scheme and the set S2 comprises a set f(a) of k polynomial functions of the HFEV scheme.

5. A method according to claim 4 and wherein said set S2 comprises an expression including k functions that are derived from a univariate polynomial.

6. A method according to claim 5 and wherein said univariate polynomial includes a univariate polynomial of degree less than or equal to 100,000.

7. A method according to claim 1 and wherein the method comprises a UOV scheme and the set S2 comprises a set S of k polynomial functions of the UOV scheme.

8. A method according to claim 1 and wherein v is selected such that $q^v$ is greater than $2^{32}$, where q is the number of elements of a finite field K over which the sets S1, S2 and S3 are provided.

9. A method according to claim 1 and wherein said supplying comprises obtaining the set S1 from a subset S2' of k polynomial functions of the set S2, the subset S2' being characterized in that all coefficients of components involving any of the $y_1, \ldots, y_k$ variables in the k polynomial functions $P'_1(a_1, \ldots, a_{n+v}, y_1, \ldots, y_k), \ldots, P'_k(a_1, \ldots, a_{n+v}, y_1, \ldots, y_k)$ are zero, and the number v of "vinegar" variables is greater than the number n of "oil" variables.

10. A method according to claim 9 and wherein the set S2 comprises a set S of k polynomial functions of a UOV scheme, and the number v of "vinegar" variables is selected to satisfy one of the following conditions:

(a) for each characteristic p other than 2 of a field K in an "Oil and Vinegar" scheme of degree 2, v satisfies the inequality $q^{(v-n)-1}*n^4>2^{40}$, where K is a finite field over which the sets S1, S2 and S3 are provided, (b) for p=2 in an "Oil and Vinegar" scheme of degree 3, v is greater than $n*(1+\sqrt{3})$ and less than or equal to $n^3/6$, and (c) for each p other than 2 in an "Oil and Vinegar" scheme of degree 3, v is greater than n and less than or equal to $n^4$.

11. A method according to claim 9 and wherein the set S2 comprises a set S of k polynomial functions of a UOV scheme, and the number v of "vinegar" variables is selected to satisfy the inequalities $v<n^2$ and $q^{(v-n)-1}*n^4>2^{40}$ for a characteristic p=2 of a field K in an "Oil and Vinegar" scheme of degree 2, where K is a finite field over which the sets S1, S2 and S3 are provided and q is the number of elements of K.

12. A method according to claim 1 and wherein said secret key operation comprises a secret affine transformation s on the n+v variables $a_1, \ldots, a_{n+v}$.

13. A cryptographic method for verifying the digital signature of claim 1, the method comprising:

obtaining the signature $e_1, \ldots, e_{n+v}$, the message, the hash function and the public key;

applying the hash function on the message to produce the series of k values $b_1, \ldots, b_k$; and verifying that the equations $P_1(e_1, \ldots, e_{n+v}, b_1, \ldots, b_k)=0, \ldots, P_k(e_1, \ldots, e_{n+v}, b_1, \ldots, b_k)=0$ are satisfied.

14. A digital signature produced by the method of claim 1.

15. A method according to claim 1 and wherein said supplying comprises obtaining the set S1 from a subset S2' of k polynomial functions of the set S2, the subset S2' being characterized in that all coefficients of components involving orders higher than 1 of any of the n "oil" variables $a_1, \ldots, a_n$ and coefficients of components involving multiplication of two or more of the n "oil" variables $a_1, \ldots, a_n$ in the k polynomial functions $P'_1(a_1, \ldots, a_{n+v}, y_1, \ldots, y_k), \ldots, P'_k(a_1, \ldots, a_{n+v}, y_1, \ldots, y_k)$ are zero, and the number v of "vinegar" variables is greater than the number n of "oil" variables.

16. A method according to claim 15 and wherein the set S2 comprises a set S of k polynomial functions of a UOV scheme, and the number v of "vinegar" variables is selected to satisfy one of the following conditions:

(a) for each characteristic p other than 2 of a field K in an "Oil and Vinegar" scheme of degree 2, v satisfies the inequality $q^{(v-n)-1}*n^4>2^{40}$, where K is a finite field over which the sets S1, S2 and S3 are provided, (b) for p=2 in an "Oil and Vinegar" scheme of degree 3, v is greater than $n*(1+\sqrt{3})$ and less than or equal to $n^3/6$, and (c) for each p other than 2 in an "Oil and Vinegar" scheme of degree 3, v is greater than n and less than or equal to $n^4$.

17. A method according to claim 15 and wherein the set S2 comprises a set S of k polynomial functions of a UOV scheme, and the number v of "vinegar" variables is selected to satisfy the inequalities $v<n^2$ and $q^{(v-n)-1}*n^4>2^{40}$ for a characteristic p=2 of a field K in an "Oil and Vinegar"

scheme of degree 2, where K is a finite field over which the sets S1, S2 and S3 are provided and q is the number of elements of K.

18. A method according to claim 1 and wherein the computing device comprises at least one of the following: a computer; and a smart card.

19. A computer system for generating a signature, comprising:
a signature input receiver operative to receive a set S1 of k polynomial functions as a public-key and a message to be signed, the set S1 including the functions $P_1(x_1, \ldots, x_{n+v}, y_1, \ldots, y_k), \ldots, P_k(x_1, \ldots, x_{n+v}, y_1, \ldots, y_k)$, where k, v, and n are integers, $x_1, \ldots, x_{n+v}$ are n+v variables of a first type, $y_1, \ldots, y_k$ are k variables of a second type, and the set S1 is obtained by applying a secret key operation on a set S2 of k polynomial functions $P'_1(a_1, \ldots, a_{n+v}, y_1, \ldots, y_k), \ldots, P'_k(a_1, \ldots, a_{n+v}, y_1, \ldots, y_k)$, where $a_1, \ldots, a_{n+v}$ are n+v variables which include a set of n "oil" variables $a_1, \ldots, a_n$, and a set of v "vinegar" variables $a_{n+1}, \ldots, a_{n+v}$ and the number v of "vinegar" variables is greater than the number n of "oil" variables; and
a signature processor operatively associated with the signature input receiver and operative to perform the following operations:
to apply a hash function on the message to produce a series of k values $b_1, \ldots, b_k$,
to substitute the series of k values $b_1, \ldots, b_k$ for the variables $y_1, \ldots, y_k$ of the set S2 respectively to produce a set S3 of k polynomial functions $P''_1(a_1, \ldots, a_{n+v}), \ldots, P''_k(a_1, \ldots, a_{n+v})$,
to select v values $a'_{n+1}, \ldots, a'_{n+v}$ for the v "vinegar" variables $a_{n+1}, \ldots, a_{n+v}$;
to solve a set of equations $P''_1(a_1, \ldots, a_n, a'_{n+1}, \ldots, a'_{n+v})=0, \ldots, P''_k(a_1, \ldots, a_n, a'_{n+1}, \ldots, a'_{n+v})=0$ to obtain a solution for $a'1, \ldots, a'_n$;
to apply the secret key operation to transform $a'_1, \ldots, a'_{n+v}$ into a digital signature $e_1, \ldots, e_{n+v}$; and
to assign $e_1, \ldots, e_{n+v}$ as the digital signature of the message.

20. Apparatus according to claim 19 and also comprising a signature verifier operatively associated with the signature processor and operative to verify the digital signature.

21. Apparatus according to claim 20 and wherein said signature verifier is operative to verify the digital signature by performing the following operations:
obtaining the signature $e_1, \ldots, e_{n+v}$, the message, the hash function and the public key;
applying the hash function on the message to produce the series of k values $b_1, \ldots, b_k$; and
verifying that the equations $P_1(e_1, \ldots, e_{n+v}, b_1, \ldots, b_k)=0, \ldots, P_k(e_1, \ldots, e_{n+v}, b_1, \ldots, b_k)=0$ are satisfied.

22. Apparatus according to claim 19 and wherein the signature processor is operative to perform an HFEV scheme, and the set S2 comprises a set f(a) of k polynomial functions of the HFEV scheme.

23. Apparatus according to claim 22 and wherein said set S2 comprises an expression including k functions that are derived from a univariate polynomial.

24. Apparatus according to claim 23 and wherein said univariate polynomial includes a univariate polynomial of degree less than or equal to 100,000.

25. Apparatus according to claim 19 and wherein the signature processor is operative to perform a UOV scheme, and the set S2 comprises a set S of k polynomial functions of the UOV scheme.

26. Apparatus according to claim 19 and wherein v is selected such that $q^v$ is greater than $2^{32}$, where q is the number of elements of a finite field K over which the sets S1, S2 and S3 are provided.

27. Apparatus according to claim 19 and wherein the set S1 is obtained from a subset S2' of k polynomial functions of the set S2, the subset S2' being characterized in that all coefficients of components involving any of the $y_1, \ldots, y_k$ variables in the k polynomial functions $P'_1(a_1, \ldots, a_{n+v}, y_1, \ldots, y_k), \ldots, P'_k(a_1, \ldots, a_{n+v}, y_1, \ldots, y_k)$ are zero, and the number v of "vinegar" variables is greater than the number n of "oil" variables.

28. Apparatus according to claim 27 and wherein the set S2 comprises a set S of k polynomial functions of a UOV scheme, and the number v of "vinegar" variables is selected to satisfy one of the following conditions:
(a) for each characteristic p other than 2 of a field K in an "Oil and Vinegar" scheme of degree 2, v satisfies the inequality $q^{(v-n)-1}*n^4 > 2^{40}$, where K is a finite field over which the sets S1 and S3 are provided,
(b) for p=2 in an "Oil and Vinegar" scheme of degree 3, v is greater than $n*(1+\sqrt{3})$ and less than or equal to $n^3/6$, and
(c) for each p other than 2 in an "Oil and Vinegar" scheme of degree 3, v is greater than n and less than or equal to $n^4$.

29. Apparatus according to claim 27 and wherein the set S2 comprises a set S of k polynomial functions of a UOV scheme, and the number v of "vinegar" variables is selected to satisfy the inequalities $v < n^2$ and $q^{(v-n)-1}*n^4 > 2^{40}$ for a characteristic p=2 of a field K in an "Oil and Vinegar" scheme of degree 2, where K is a finite field over which the sets S1, S2 and S3 are provided and q is the number of elements of K.

30. Apparatus according to claim 19 and wherein said secret key operation comprises a secret affine transformation s on the n+v variables $a_1, \ldots, a_{n+v}$.

31. A signature verifier for verifying the digital signature generated by the signature generator of claim 19, the signature verifier comprising a verifier processor operative to perform the following operations:
to obtain the signature $e_1, \ldots, e_{n+v}$, the message, the hash function and the public key via the signature input receiver;
to apply the hash function on the message to produce the series of k values $b_1, \ldots, b_k$; and
to verify that the equations $P_1(e_1, \ldots, e_{n+v}, b_1, \ldots, b_k)=0, \ldots, P_k(e_1, \ldots e_{n+v}, b_1, \ldots, b_k)=0$ are satisfied.

32. Apparatus according to claim 19 and wherein the set S1 is obtained from a subset S2' of k polynomial functions of the set S2, the subset S2' being characterized in that all coefficients of components involving orders higher than 1 of any of the n "oil" variables $a_1, \ldots, a_n$ and coefficients of components involving multiplication of two or more of the n "oil" variables $a_1, \ldots, a_n$ in the k polynomial functions $P'_1(a_1, \ldots, a_{n+v}, y_1, \ldots, y_k), \ldots, P'_k(a_1, \ldots, a_{n+v}, y_1, \ldots, y_k)$ are zero, and the number v of "vinegar" variables is greater than the number n of "oil" variables.

33. Apparatus according to claim 32 and wherein the set S2 comprises a set S of k polynomial functions of a UOV scheme, and the number v of "vinegar" variables is selected to satisfy one of the following conditions:
(a) for each characteristic p other than 2 of a field K in an "Oil and Vinegar" scheme of degree 2, v satisfies the inequality $q^{(v-n)-1}*n^4 > 2^{40}$, where K is a finite field over which the sets S1, S2 and S3 are provided, (b) for p=2 in an "Oil and Vinegar" scheme of degree 3, v is greater than n*(1+sqrt(3)) and less than or equal to $n^3/6$, and (c) for each p other than 2 in an "Oil and Vinegar" scheme of degree 3, v is greater than n and less than or equal to $n^4$.

34. Apparatus according to claim 32 and wherein the set S2 comprises a set S of k polynomial functions of a UOV scheme, and the number v of "vinegar" variables is selected to satisfy the inequalities $v<n^2$ and $q^{(v-n)-1}*n^4>2^{40}$ for a characteristic p=2 of a field K in an "Oil and Vinegar" scheme of degree 2, where K is a finite field over which the sets S1, S2 and S3 are provided and q is the number of elements of K.

35. Apparatus according to claim 19 and wherein the computer system comprises at least one of the following: a computer; and a smart card.

36. A digital signature generated by a computer system the digital signature comprising:

a signature $e_1, \ldots, e_{n+v}$ generated by processing a set S1 of k polynomial functions provided as a public-key and a message to be signed, where the set S1 includes functions $P_1(x_1, \ldots, x_{n+v}, y_1, \ldots, y_k), \ldots, P_k(x_1, \ldots, x_{n+v}, y_1, \ldots, y_k)$, where k, v, and n are integers, $x_1, \ldots, x_{n+v}$ are n+v variables of a first type, $y_1, \ldots, y_k$ are k variables of a second type, and the set S1 is obtained by applying a secret key operation on a set S2 of k polynomial functions $P'_1(a_1, \ldots, a_{n+v}, y_1, \ldots, y_k), \ldots, P'_k(a_1, \ldots, a_{n+v}, y_1, \ldots, y_k)$ where $a_1, \ldots, a_{n+v}$ are n+v variables which include a set of n "oil" variables $a_1, \ldots, a_n$, and a set of v "vinegar" variables $a_{n+1}, \ldots, a_{n+v}$, and the number v of "vinegar" variables is greater than the number n of "oil" variables, so that a hash function applied on the message to produce a series of k values $b_1, \ldots, b_k$ that are substituted for the variables $y_1, \ldots, y^k$ of the set S2 respectively to produce a set S3 of k polynomial functions $P''_1(a_1, \ldots, a_{n+v}), \ldots, P''_k(a_1, \ldots, a_{n+v})$ and v values $a'_{n+1}, \ldots, a'_{n+v}$ that are selected for the v "vinegar" variables $a_{n+1}, \ldots, a_{n+v}$ enable to solve a set of equations $P''_1(a_1, \ldots, a_n, a'_{n+1}, \ldots, a'_{n+v})=0, \ldots, P''_k(a_1, \ldots, a_n, a'_{n+1}, \ldots, a'_{n+v})=0$ to obtain a solution for $a'_1, \ldots, a'_{n+v}$, and application of the secret key operation transforms $a'_1, \ldots, a'_{n+v}$ into $e_1, \ldots, e_{n+v}$ which is assigned as the digital signature of the message.

* * * * *

UNITED STATES PATENT AND TRADEMARK OFFICE
CERTIFICATE OF CORRECTION

PATENT NO. : 7,100,051 B1
APPLICATION NO. : 09/552115
DATED : August 29, 2006
INVENTOR(S) : Aviad Kipnis et al.

It is certified that error appears in the above-identified patent and that said Letters Patent is hereby corrected as shown below:

In claim 1, col. 35, line 14, "variables an $a_{n+1},...,a_{n+v}$," should read -- variables $a_{n+1},...,a_{n+v}$, --.

In claim 1, col. 35, line 24, "$a'_{n+1},...,a_{n+v}$" should read -- $a'_{n+1},...,a'_{n+v}$ --.

In claim 13, col. 36, line 32, "$_{b1},...,b_k)=$" should read -- $b_1,...,b_k)=$ --.

In claim 19, col. 37, line 36, "$a'1,...,a'_n;$" should read -- $a'_1,...,a'_n;$ --.

In claim 36, col. 39, line 18, "system" should read -- system, --.

In claim 36, col. 40, line 12, "$y_1,...,y^k$" should read -- $y_1,...,y_k$ --.

In claim 36, col. 40, line 18, "$a'_1,...,a'_{n+v}$," should read -- $a'_1,...,a'_n$, --.

Signed and Sealed this

Second Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,100,051 B1
APPLICATION NO. : 09/552115
DATED : August 29, 2006
INVENTOR(S) : Aviad Kipnis et al.

Page 1 of 1

It is certified that error appears in the above-identified patent and that said Letters Patent is hereby corrected as shown below:

In claim 1, col. 35, line 22, "functions $P_k''(a_1,...$" should read --functions $P_1''(a_1,...,$--

In claim 36, col. 40, line 15, "$a_{n+v}$" should read --$a_{n+v}$,--

Signed and Sealed this

Twenty-first Day of October, 2008

JON W. DUDAS
*Director of the United States Patent and Trademark Office*